US011917689B2

(12) United States Patent
Ly et al.

(10) Patent No.: US 11,917,689 B2
(45) Date of Patent: Feb. 27, 2024

(54) REDUNDANCY VERSION (RV) DETERMINATION FOR MESSAGE REPETITION

(71) Applicant: QUALCOMM Incorporated, San Diego, CA (US)

(72) Inventors: Hung Dinh Ly, San Diego, CA (US); Gokul Sridharan, Sunnyvale, CA (US); Hwan Joon Kwon, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 17/365,849

(22) Filed: Jul. 1, 2021

(65) Prior Publication Data

US 2022/0015149 A1    Jan. 13, 2022

Related U.S. Application Data

(60) Provisional application No. 63/049,096, filed on Jul. 7, 2020.

(51) Int. Cl.
*H04W 74/08* (2009.01)
*H04W 74/00* (2009.01)
(Continued)

(52) U.S. Cl.
CPC ....... *H04W 74/0833* (2013.01); *H04L 1/0061* (2013.01); *H04L 1/189* (2013.01);
(Continued)

(58) Field of Classification Search
CPC ........... H04W 74/0833; H04W 74/006; H04W 72/0466; H04W 72/23; H04L 1/0041;
(Continued)

(56) References Cited

U.S. PATENT DOCUMENTS

| 10,257,872 B2 * | 4/2019 | Matsumoto | ....... H04W 72/0453 |
| 10,291,378 B1 * | 5/2019 | Bai | ....... H04L 1/0016 |

(Continued)

FOREIGN PATENT DOCUMENTS

| EP | 3694127 A1 * | 8/2020 | ........... H04L 1/1819 |
| EP | 3417558 B1 * | 7/2021 | ........... H04L 1/1812 |

(Continued)

OTHER PUBLICATIONS

3GPP: "3rd Generation Partnership Project; Technical Specification Group Radio Access Network; NR; Physical Layer Procedures for Data (Release 16)", 3GPP TS 38.214 V16.6.0, (Jun. 2021), 171 Pages. Jun. 2021.

(Continued)

*Primary Examiner* — Mohammad S Adhami
*Assistant Examiner* — Vladislav Y Agureyev
(74) *Attorney, Agent, or Firm* — Shumaker & Sieffert, P. A.

(57) ABSTRACT

Aspects of the disclosure relate to random access procedures. In one example, a UE initiates a random access procedure with a base station, and receives a random access response (RAR) message from the base station in response to the initiating of the random access procedure. The UE further determines a redundancy version (RV) pattern comprising a sequence of a plurality of RVs. The UE also transmits an uplink (UL) communication to the base station as part of the random access procedure. The UL communication comprises a plurality of repetitions of a UL message, each repetition being an iteration of the UL message that is configured by applying a respective RV of the plurality of RVs to the UL message based on the sequence. The UE further receives a downlink message from the base station based on the UL message. Other aspects, embodiments, and features are also claimed and described.

52 Claims, 11 Drawing Sheets

(51) Int. Cl.
*H04L 1/00* (2006.01)
*H04W 72/044* (2023.01)
*H04L 1/1867* (2023.01)
*H04W 72/23* (2023.01)

(52) U.S. Cl.
CPC ....... *H04W 72/0466* (2013.01); *H04W 72/23* (2023.01); *H04W 74/006* (2013.01)

(58) Field of Classification Search
CPC ... H04L 1/0046; H04L 1/0061; H04L 1/0072; H04L 1/08; H04L 1/1864; H04L 1/1819; H04L 1/189
See application file for complete search history.

(56) References Cited

U.S. PATENT DOCUMENTS

| | | | |
|---|---|---|---|
| 11,432,324 B2* | 8/2022 | Lei | H04L 5/0051 |
| 11,477,823 B2* | 10/2022 | Zhang | H04W 72/02 |
| 2017/0251499 A1* | 8/2017 | Radulescu | H04W 48/16 |
| 2017/0288817 A1* | 10/2017 | Cao | H04L 1/0079 |
| 2019/0036647 A1* | 1/2019 | Gowda | H04W 52/0232 |
| 2019/0097767 A1* | 3/2019 | Qin | H04L 1/0014 |
| 2019/0110314 A1* | 4/2019 | Abedini | H04W 72/23 |
| 2019/0150192 A1* | 5/2019 | He | H04W 74/085 370/329 |
| 2019/0159257 A1* | 5/2019 | Rico Alvarino | H04L 1/0003 |
| 2020/0015200 A1* | 1/2020 | Vilaipornsawai | H04W 72/23 |
| 2020/0053777 A1* | 2/2020 | Babaei | H04L 1/1812 |
| 2020/0221440 A1* | 7/2020 | Yasukawa | H04W 4/70 |
| 2020/0244429 A1* | 7/2020 | Bao | H04W 36/08 |
| 2020/0336248 A1* | 10/2020 | Bae | H04L 5/0055 |
| 2020/0374959 A1* | 11/2020 | Park | H04L 5/0055 |
| 2021/0007066 A1* | 1/2021 | Lin | H04W 76/11 |
| 2021/0219246 A1* | 7/2021 | Xu | H04L 1/1819 |
| 2021/0297999 A1* | 9/2021 | Kim | H04W 72/23 |
| 2021/0314925 A1* | 10/2021 | Shin | H04L 5/0053 |
| 2021/0337625 A1* | 10/2021 | Tsai | H04W 76/30 |
| 2021/0344452 A1* | 11/2021 | Liu | H04W 72/23 |
| 2021/0360660 A1* | 11/2021 | Cozzo | H04W 72/0453 |
| 2021/0368534 A1* | 11/2021 | Sato | H04W 72/1268 |
| 2021/0392659 A1* | 12/2021 | Tirronen | H04L 1/1671 |
| 2022/0039068 A1* | 2/2022 | Hoglund | H04W 74/0833 |
| 2022/0095335 A1* | 3/2022 | Gao | H04L 1/189 |
| 2022/0095365 A1* | 3/2022 | Jeon | H04W 72/23 |
| 2022/0123885 A1* | 4/2022 | Shin | H04W 74/0833 |
| 2022/0150924 A1* | 5/2022 | Gao | H04L 1/189 |
| 2022/0159742 A1* | 5/2022 | Xu | H04W 24/10 |
| 2022/0217686 A1* | 7/2022 | Matsumura | H04L 5/0091 |
| 2022/0394776 A1* | 12/2022 | Harrison | H04W 8/26 |
| 2023/0074086 A1* | 3/2023 | Yi | H04L 1/1822 |
| 2023/0099975 A1* | 3/2023 | Hahn | H04W 80/08 370/329 |
| 2023/0114616 A1* | 4/2023 | Park | H04W 76/27 370/329 |

FOREIGN PATENT DOCUMENTS

| | | | | |
|---|---|---|---|---|
| EP | 3846570 A1 * | 7/2021 | ........... | H04L 1/08 |
| EP | 3902366 A1 * | 10/2021 | ........... | H04L 1/1819 |
| EP | 4040694 A1 * | 8/2022 | ........... | H04L 1/0023 |
| EP | 4145740 A1 * | 3/2023 | ........... | H04L 1/1816 |
| WO | 2020020094 A1 | 1/2020 | | |

OTHER PUBLICATIONS

International Search Report and Written Opinion—PCT/US2021/040255—ISA/EPO—dated Oct. 19, 2021.

* cited by examiner

REDUNDANCY VERSION (RV) DETERMINATION FOR MESSAGE REPETITION

PRIORITY CLAIM

This application claims priority to and the benefit of provisional patent application No. 63/049,096 filed in the U.S. Patent and Trademark Office on Jul. 7, 2020, the entire content of which is incorporated herein by reference as if fully set forth below in its entirety and for all applicable purposes.

TECHNICAL FIELD

The technology discussed below relates generally to wireless communication systems, and more particularly, to random access procedures. Some aspects may include enabling and providing communication devices configured to improving reliability and coverage of uplink traffic transmissions in random access procedures.

INTRODUCTION

In many wireless communication systems, a random access procedure provides a way for a mobile device to initiate a data transfer to a network. Often, a random access procedure is a contention-based procedure, where two or more such mobile devices that both wish to initiate their own data transfer contend for wireless resources. Sometimes, the random access procedures carried out by these competing devices can cause collisions in their transmissions, inhibiting the network from receiving from either one. Various random access procedures have been established for operation in the variety of wireless communication networks deployed today, with robust contention resolution procedures and reasonably good reliability.

As the demand for mobile broadband access continues to increase, research and development continue to advance wireless communication technologies not only to meet the growing demand for mobile broadband access, but to advance and enhance the user experience with mobile communications. For example, a random access procedure having further improved reliability and coverage could improve user experience.

BRIEF SUMMARY OF SOME EXAMPLES

The following presents a simplified summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In various aspects, the disclosure generally relates to techniques for improving reliability and enhancing latency. Features discussed below (e.g., redundancy versioning techniques) can bring about such benefits for a variety of wireless communications scenarios. These may include, for example, physical uplink shared channels transmitted by a user equipment (and received by a base station) by utilizing different repetitions of RVs. In some deployments, RV repetition may be done according to a relevant RV pattern. And in some instances, each RV may be according to a particular message to be transmitted or being transmitted by a user equipment (UE). Various other features associated with improving access procedures are discussed below.

In some aspects of the disclosure, a UE may initiate a random access procedure with a base station, and transmit an uplink (UL) message to the base station as part of the random access procedure. The UE may receive a request from the base station to retransmit the UL message, and determine a redundancy version (RV) pattern that can include a sequence of a plurality of RVs. The UE may transmit, in response to the received request, a UL message retransmission. The UL message retransmission may include a plurality of repetitions of the UL message. Each repetition may be configured according to a respective RV of the plurality of RVs based on the sequence.

In one example, a method of wireless communication operable at a user equipment (UE), is disclosed. The method includes receiving a random access response (RAR) message from a base station a part of a random access procedure. The method also includes transmitting an uplink (UL) communication to the base station as part of the random access procedure, the UL communication comprising a plurality of repetitions of a UL message, each repetition being configured by applying, to the UL message, a respective RV of an RV pattern having a plurality of RVs. The method further includes receiving a downlink message from the base station based on the UL message.

In another example, an apparatus for wireless communication is disclosed. The apparatus includes means for receiving a random access response (RAR) message from a base station a part of a random access procedure. The apparatus also includes means for transmitting an uplink (UL) communication to the base station as part of the random access procedure, the UL communication comprising a plurality of repetitions of a UL message, each repetition being configured by applying, to the UL message, a respective RV of an RV pattern having a plurality of RVs. The apparatus further includes means for receiving a downlink message from the base station based on the UL message.

In another example, a non-transitory computer-readable medium storing computer-executable code is disclosed. The computer-executable code includes code for causing a user equipment (UE) to receive a random access response (RAR) message from a base station a part of a random access procedure. The computer-executable code also includes code for causing the UE to transmit an uplink (UL) communication to the base station as part of the random access procedure, the UL communication comprising a plurality of repetitions of a UL message, each repetition being configured by applying, to the UL message, a respective RV of an RV pattern having a plurality of RVs. The computer-executable code further includes code for causing the UE to receive a downlink message from the base station based on the UL message.

In another example, an apparatus for wireless communication is disclosed. The apparatus includes a processor; a transceiver communicatively coupled to the processor; and a memory communicatively coupled to the processor. The processor and the memory are configured to receive, via the transceiver, a random access response (RAR) message from a base station a part of a random access procedure. The processor and the memory are also configured to transmit, via the transceiver, an uplink (UL) communication to the base station as part of the random access procedure, the UL communication comprising a plurality of repetitions of a UL message, each repetition being configured by applying, to the UL message, a respective RV of an RV pattern having a plurality of RVs. The processor and the memory are further configured to receive, via the transceiver, a downlink message from the base station based on the UL message.

In another example, a method of wireless communication operable at a base station is disclosed. The method includes receiving a random access request from a UE to initiate a random access procedure and transmitting a random access response (RAR) message to the UE in response to the random access request. The method also includes receiving an uplink (UL) communication from the UE as part of the random access procedure, the UL communication comprising a plurality of repetitions of a UL message, each repetition having been configured from application, to the UL message, of a respective RV of an RV pattern having a plurality of RVs. The method further includes decoding the UL communication based on the RV pattern; and sending a downlink message to the UE based on the UL message.

In another example, an apparatus for wireless communication is disclosed. The apparatus includes a processor; a transceiver communicatively coupled to the processor; and a memory communicatively coupled to the processor. The processor and memory are configured to receive, via the transceiver, a random access request from a UE to initiate a random access procedure, and to transmit, via the transceiver, a random access response (RAR) message to the UE in response to the random access request. The processor and memory are also configured to receive, via the transceiver, an uplink (UL) communication from the UE as part of the random access procedure, the UL communication comprising a plurality of repetitions of a UL message, each repetition having been configured from application, to the UL message, of a respective RV of an RV pattern having a plurality of RVs. The processor and memory are configured to decode the UL communication based on the RV pattern; and to send, via the transceiver, a downlink message to the UE based on the UL message.

These and other aspects of the technology discussed herein will become more fully understood upon a review of the detailed description, which follows. Other aspects, features, and embodiments will become apparent to those of ordinary skill in the art, upon reviewing the following description of specific, exemplary embodiments in conjunction with the accompanying figures. While the following description may discuss various advantages and features relative to certain embodiments and figures, all embodiments can include one or more of the advantageous features discussed herein. In other words, while this description may discuss one or more embodiments as having certain advantageous features, one or more of such features may also be used in accordance with the various embodiments discussed herein. In similar fashion, while this description may discuss exemplary embodiments as device, system, or method embodiments it should be understood that such exemplary embodiments can be implemented in various devices, systems, and methods.

DETAILED DESCRIPTION

Figure 1:
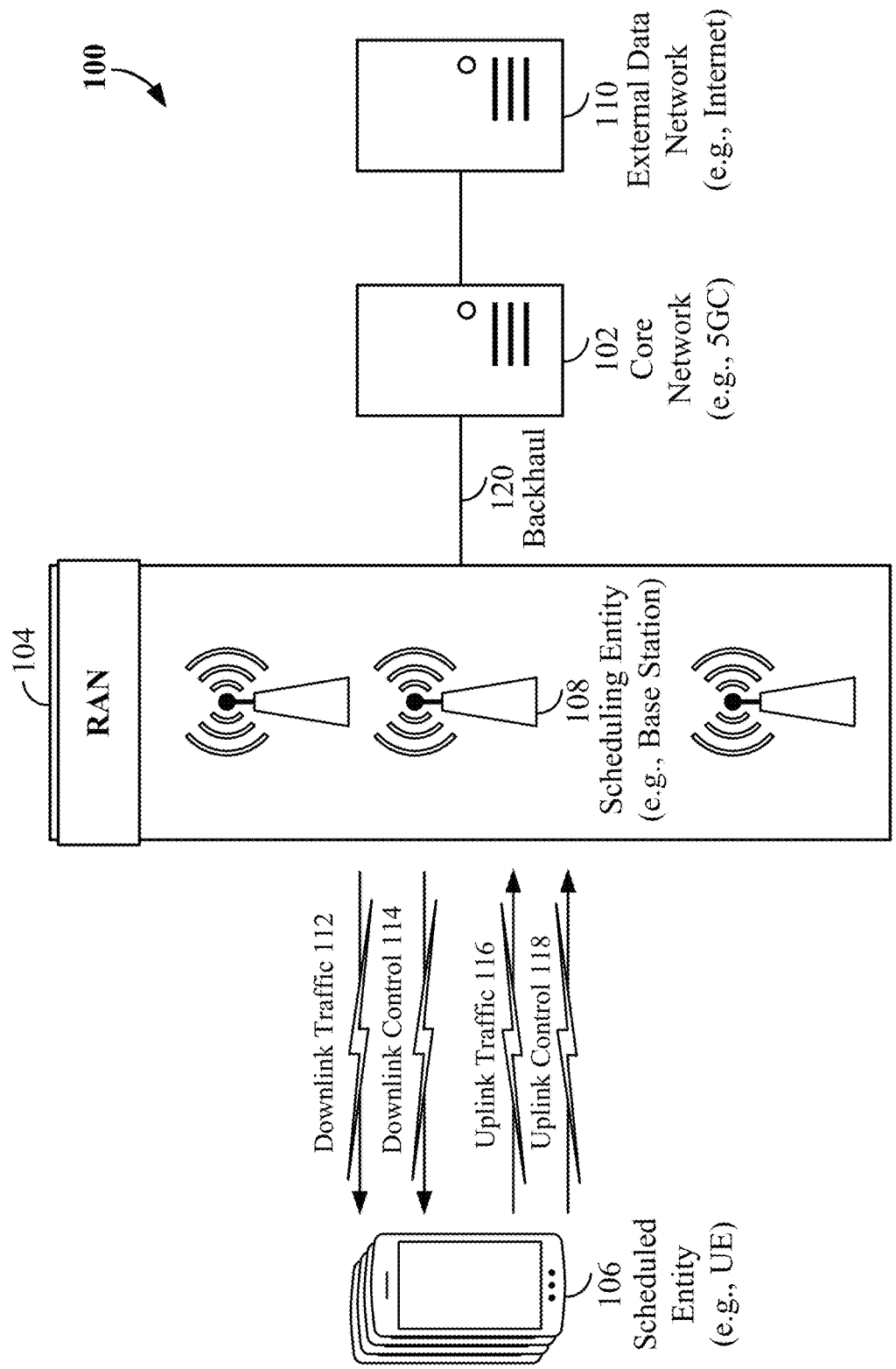
FIG. 1 is a schematic illustration of a wireless communication system according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, packaging arrangements, etc. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated devices, disaggregated arrangements, end-user devices, etc. of varying sizes, shapes and constitution.

In various aspects, the disclosure relates to improving reliability (and preventing or mitigating latency) for physical uplink shared channels transmitted by a user equipment (and received by a base station). Such benefits may come about in some deployments by utilizing different repetitions of RVs according to a relevant RV pattern. Further, in some scenarios, such benefits may come about when RVs are based on a particular message to be transmitted or being transmitted by a user equipment (UE). These techniques may be utilized in various network access scenarios.

Generally in network access procedures, a wireless device may connect with another wireless device. For example, in a random access procedure, a UE may transmit an uplink (UL) communication to a base station. The communication can include a plurality of repetitions of a UL message (e.g., a MSG3 message, described further below). Each repetition may be an iteration of the UL message. The UL message can be configured by applying a respective RV of a sequence of RVs to the UL message. The UL communication may be for an initial MSG3 message (sent in response to a response access response (RAR) message) or a retransmission of the MSG3 message (sent in response to a MSG3 retransmission request). The sequence of RVs may be fixed and known to both the UE and base station, or the sequence of RVs may be adaptable and indicated in information communicated by a base station to the UE. By the UE transmitting multiple repetitions of the UL message, the base station may have an increased likelihood of receiving and decoding the UL message.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes several interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, those skilled in the art may variously refer to a base station as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 supports wireless communication for multiple mobile apparatuses. Those skilled in the art may refer to a mobile apparatus as user equipment (UE) in 3GPP standards, but may also be refer to a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides access to network services. A UE may take on many forms and can include a range of devices.

Within the present document, a "mobile" apparatus (aka a UE) need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
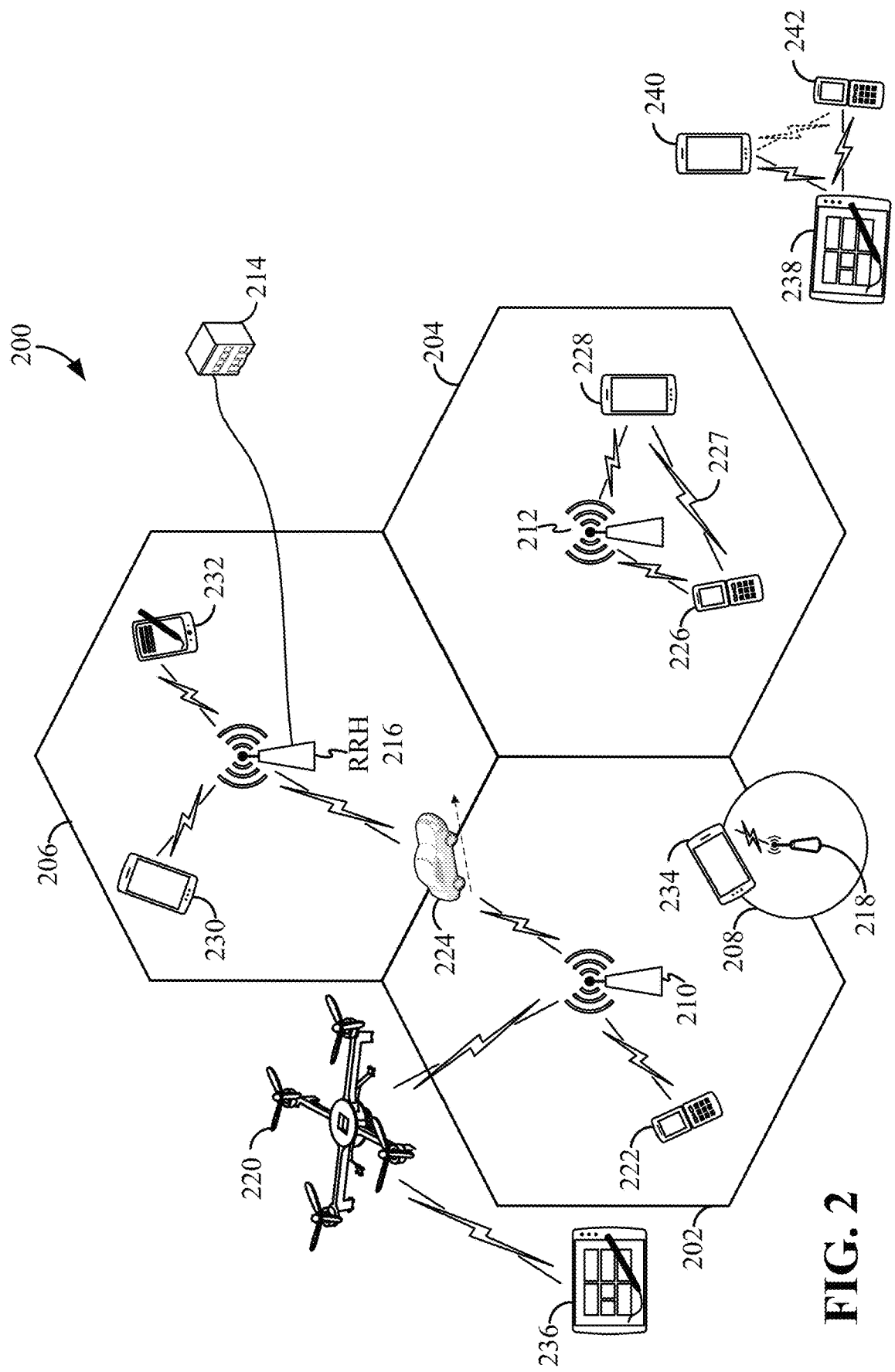
FIG. 2 is a conceptual illustration of an example of a radio access network according to some embodiments.

FIG. 2 provides a schematic illustration of a RAN 200, by way of example and without limitation. In some examples, the RAN 200 may be the same as the RAN 104 described above and illustrated in FIG. 1. The geographic area covered by the RAN 200 may be divided into cellular regions (cells) that a user equipment (UE) can uniquely identify based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

FIG. 2 shows two base stations 210 and 212 in cells 202 and 204; and shows a third base station 214 controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

The RAN 200 may include any number of wireless base stations and cells. Further, a RAN may include a relay node to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. An access and mobility management function (AMF, not illustrated, part of the core network 102 in FIG. 1) may generally set up, maintain, and release the various physical channels between the UE and the radio access network. The AMF may further include a security context management function (SCMF) that manages the security context for both the control plane and the user plane functionality, and a security anchor function (SEAF) that performs authentication.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time utilizing a given resource. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes. For example, a UE may provide for UL multiple access utilizing time division multiple access (TDMA), code division multiple access (CDMA), frequency division multiple access (FDMA), sparse code multiple access (SCMA), resource spread multiple access (RSMA), or other suitable multiple access schemes. Further, a base station may multiplex DL transmissions to UEs utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for bit errors that may occur due to the noise.

In 5G NR specifications, user data may be coded using quasi-cyclic low-density parity check (LDPC) with two different base graphs: one base graph for large code blocks and/or high code rates, while the other base graph is used otherwise. Control information and the physical broadcast channel (PBCH) may be coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

A further technique may still further improve transmission reliability when utilized in combination with channel coding, as described above. For example, hybrid automatic repeat request (HARQ) is a technique well-known to those of ordinary skill in the art, wherein a receiving device can verify the integrity of a received packet, e.g., utilizing any suitable integrity checking mechanism, such as a checksum or a cyclic redundancy check (CRC). If the integrity of the transmission confirmed, the receiving device may transmit an ACK, whereas if not confirmed, the receiving device may transmit a NACK. In response to a NACK, the transmitting device may send a HARQ retransmission, which may implement chase combining, incremental redundancy, etc. With chase combining, retransmissions generally include the same information as the original transmission. Here, a receiving device can use maximum-ratio combining of the respective transmissions to combine the received energy of sequential transmissions and improve the probability of accurate bit hypotheses. With incremental redundancy, however, each retransmission generally includes different information from the original transmission, as well as different information from each other. The transmitting device generates multiple sets of coded information, and configures each retransmission utilizing a different redundancy version (RV) by puncturing the encoder output. At each retransmission, a receiving device gains additional information, improving the probability of a correct hypothesis at each retransmission.

Figure 3:
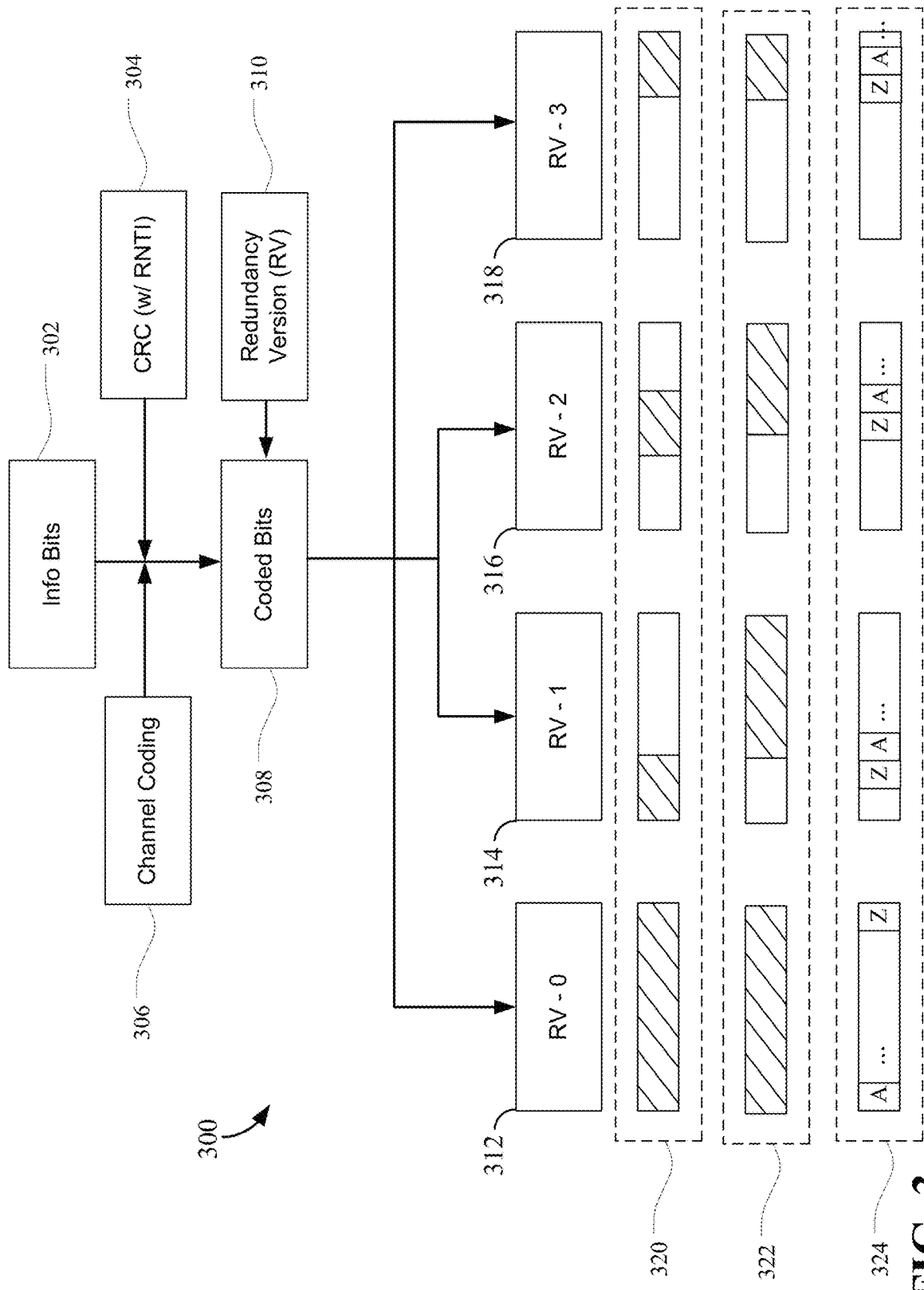
FIG. 3 is a conceptual illustration of a process for generating different redundancy versions (RVs) for a given transmission according to some embodiments of the disclosure.

FIG. 3 shows a conceptual illustration of a process 300 for generating packets having RVs corresponding to a determined RV pattern for a given transmission according to some aspects of the disclosure. For example, a transmitting device may start process 300 with information bits 302 that the transmitting device may transmit. The transmitting device can calculate cyclic redundancy check (CRC) bits, and append or attach these CRC bits to the information bits. In some scenarios, a transmitting device may scramble CRC bits with an appropriate Radio Network Temporary Identifier (RNTI) (e.g., appropriate to the transmission type), as indicated at block 304. Additionally or alternatively, a transmitting device may utilize a suitable channel coding algorithm 306, as described above, to generate coded bits 308. An encoder of the transmitting device may implement one or more of the blocks 306 and 304 to modify the info bits 302 and generate the coded bits 308 as an output. To generate different RVs of the coded bits 308, the transmitting device may suitably "puncture" the coded bits 308 output by the encoder with the redundancy version 310. The redundancy version 310 may represent redundancy versions (RVs) of an RV pattern. When the transmitting device applies the RVs of the RV pattern to the coded bits 308, the transmitting device generates different RVs 312, 314, 316, 318 of the coded bits 308 that are destined for transmission. Each of the RVs 312, 314, 316, 318 may correspond to a particular RV of the coded bits 308. Each RV of the coded bits 308 may contain different amounts of coded bits, and/or different portions of the full set of coded bits 308. In particular, as illustrated in FIG. 3, RV 312 corresponds with RV-0, RV 314 corresponds with RV-1, RV 316 corresponds with RV-2, and RV 318 corresponds with RV-3. FIG. 3 further illustrates three example RV configurations 320, 322, and 324 for the RVs 312, 314, 316, and 318 that the transmitting device may generate. Each of the RV configurations 320, 322, and 324 may be associated with a different RV pattern used by the transmitting device to generate each respective RV configuration 320, 322, and 324.

In one exemplary RV configuration 320, the RV 312 (corresponding to RV-0) is the entire transmission of the coded bits 308 (e.g., the entire string of coded bits 308), while each of the RVs 314, 316, 318 have different partitions of the string of coded bits 308. For example, RV 314 has only the first (or otherwise beginning) portion of the string of coded bits 308, RV 316 has only the middle portion of the string of coded bits 308, while RV 318 has the end portion of the string of coded bits 308.

In another exemplary RV configuration 322, the RV 312 is the entire transmission of the coded bits 308, and each of the RVs 314, 316, 318 have different, but overlapping, portions of the string of coded bits 308. For example, RV 314 has the end two thirds of the string of coded bits 308, RV 316 has the end half of the string of coded bits 308, and RV 318 has the end third of the string of coded bits 308.

In another exemplary RV configuration 324, the RV 312 is the entire transmission of the coded bits 308 in the order as defined by the string of coded bits 308. The other RVs 314, 316, 318, in this configuration (unlike in configurations 320, 322), all have the entire string of coded bits 308, but being circularly shifted by different amounts (e.g., the entire string of coded bits 308 are in each of the RVs 314, 316, 318, but the RVs 314, 316, 318 are different in that they are each circularly shifted versions of the coded bits 308, having different starting locations).

The RV configurations 320, 322, 324 can be defined by various RV arrangements and compositions. For example, as illustrated, RV 312 has a starting point "A" and an ending point "Z" that defines the coded bit string for RV 312 (e.g., the order of the coded bits 308). RV 314, in this configuration, has a beginning location about a third of the distance from "A," and thus RV 314 effectively "skips" the transmission of the first third of the string of coded bits and transmits them after the remaining two thirds of the string of coded bits are transmitted as defined by the starting location. Similarly, RV 316, in this configuration, has a beginning location about half the distance from "A," and thus RV 316 "skips" the transmission of the first half of the string of coded bits and transmits them after the second half of the string of coded bits are transmitted as defined by the starting location. Lastly, RV 318, in this configuration, has a beginning location about two thirds the distance from "A," and thus RV 318 "skips" the transmission of the first two thirds of the string of coded bits and transmits them after transmitting the last third of the string of coded bits has been transmitted as defined by the starting location. Thus, effectively, the RVs 314, 316, 318 adjust the order of the coded bit string, or in other words, each of the RVs 314, 316, 318 manipulate the order of the coded bit string as defined by the string of coded bits 308 (or the RV 312, which is substantially similar to the string of coded bits 308).

Those of ordinary skill in the art will recognize that these examples are only illustrative in nature, and are not intended to provide all suitable RV configurations. That is, any suitable RV configuration may be utilized within the scope of this disclosure.

Regardless of the specific RV configuration (e.g., 320, 322, 324, or any other suitable RV configuration), the use of different RVs in different retransmissions can be helpful to ensure that the base station properly receives, and decodes, the message defined in the string of coded bits. For example, if the base station receives a transmission corresponding to multiple repetitions of a packet or message, configured according to different respective RVs, such as RV 312 (RV-0) and RV 316 (RV-2), this may increase the likelihood that the base station can reliably receive (and decode) the message. More specifically, by the base station receiving and appropriately combining multiple RVs, the base station can be more likely to successfully receive and decode the message.

As illustrated in FIG. 3, the UE can utilize (or determine) a particular RV (at 310) to generate any one of the RVs 312, 314, 316, 318 according to the RV configuration (e.g., configuration 320, 322, 324). Further utilization of the RVs will be described in more detail below.

Figure 4:
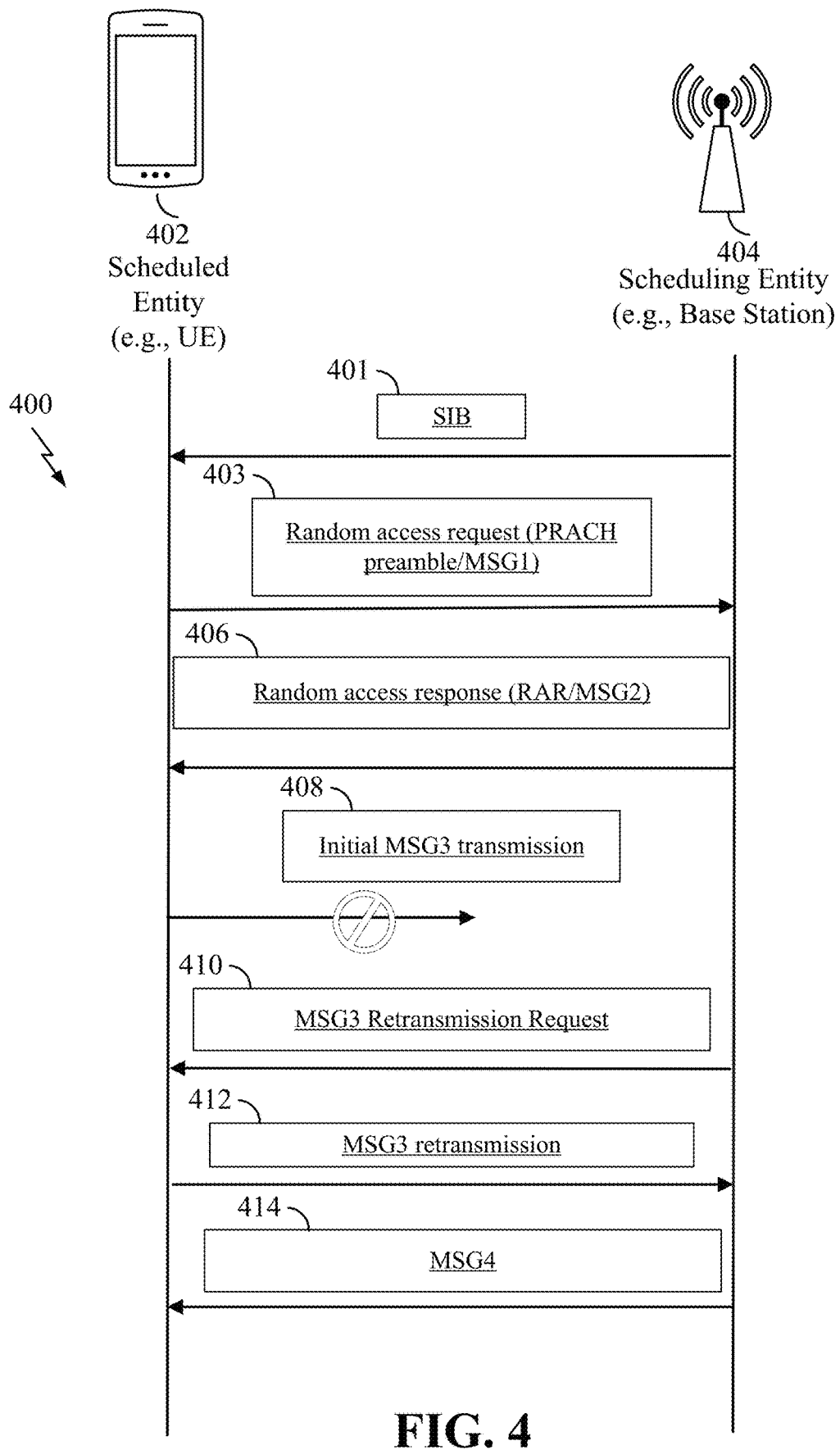
FIG. 4 is a call flow diagram illustrating a random access procedure according to some embodiments.

FIG. 4 is a call flow diagram 400 of an exemplary random access procedure as described in 3GPP specifications for 5G NR. As shown, a scheduled entity 402, such as a UE, communicates with a scheduling entity 404, such as a base station or gNB. The description below will describe the scheduled entity 402 as a UE, and the scheduling entity 404 as a base station, although it can be appreciated that in other configurations other scheduled entities and scheduling entities could be substituted, as appropriate.

As illustrated, a UE 402 may receive system information (e.g., via a system information block, SIB) 401 from the base station 404. For example, the base station 404 may periodically broadcast the system information over a corresponding cell, and or the UE 402 may request an on-demand transmission of the system information. The SIB can contain system information that includes cell access information that, when received by the UE 402, may enable the UE 402 to begin a random access procedure.

The UE 402 may transmit a RACH preamble 403 to the base station 404 over a physical random access channel (PRACH). This message 403 may equivalently be referred to as random access request or Message 1 (MSG1). If base station 404 receives MSG1 403, the base station 404 can derive a random access-radio network temporary identifier (RA-RNTI) corresponding to the UE 402 (e.g., based on MSG1 403).

If the base station 404 properly receives and decodes the MSG1 transmission, then in response, the base station 404 may transmit a random access response 406 to the UE. For example, the base station 404 may transmit a PDCCH including a DCI with a CRC scrambled by the RA-RNTI, and a corresponding PDSCH including the RAR, equivalently referred to as Message 2 (MSG2).

Thus, after transmitting MSG1 403, the UE 402 may monitor for a random access response message 406 from the base station 404. That is, the UE 402 may monitor for a PDCCH including a DCI with a CRC scrambled by the RA-RNTI. However, if the base station 404 does not properly receive or decode the MSG1 transmission, then the base station 404 may not transmit such a response. Here, if the UE 402 does not receive its expected response, e.g., after a suitable timeout period, the UE 402 may retransmit MSG1 403 one or more subsequent times.

In the illustrated call flow 400, the UE 402 receives response 406 from the base station 404, including a PDCCH that carries a DCI with a CRC scrambled by the RA-RNTI; and a corresponding PDSCH carrying MSG2/RAR. Among other things, this random access response message 406 may provide the UE 402 with a grant or scheduling information indicating UL resources for the UE 402 to use for an UL transmission (e.g., for MSG3, described further below). Furthermore, this random access response message 406 may provide the UE 402 with a temporary cell-radio network temporary identifier (TC-RNTI). The UE 402 may employ the TC-RNTI in subsequent phases of the random access procedure of the call flow 400, described further below.

When the UE 402 receives the random access response 406, the UE may then transmit message 3 (MSG3) 408 of the random access procedure. Here, MSG3 may include any suitable information, and in some examples, may be located on a PUSCH. Here, the UE 402 may utilize resources corresponding to the UL grant received in the DCI in the RAR message 406.

After transmitting MSG3 408, the UE 402 may monitor for a PDCCH transmission as a response from the base station 404. Here, if the base station 404 correctly receives and decodes MSG3 408, the base station 404 may transmit message 4 (MSG4) of the corresponding random access procedure.

In some cases, such as the scenario illustrated in FIG. 4, the base station 404 may not correctly receive or decode MSG3 408. Here, such failure may be attributed to interference between similar signals (e.g., multiple UEs transmitting), inadequate transmission power for MSG3 by the UE 402, the UE 402 being a substantial distance away from the base station, etc. In some cases, base station 404 may determine, after a period of time of not properly receiving (and decoding) MSG3 408, to transmit the MSG3 retransmission request 410. In other configurations, the base station 404 can determine whether to request the retransmission of MSG3, based on other parameters and conditions (e.g., the amount of the MSG3 properly decoded, etc.).

Accordingly, the base station 404 may transmit a request for UE retransmission of MSG3. In some configurations, the MSG3 retransmission request message 410 may include a PDCCH that carries a DCI with a CRC scrambled by the TC-RNTI indicated in the random access response message 406.

In the MSG3 retransmission request message 410, the base station 404 may include a resource allocation or grant for time-frequency resources for the UE 402 to utilize for a corresponding MSG3 retransmission.

In response to the MSG3 retransmission request 410, the UE 402 may transmit a MSG3 retransmission 412. In some examples, the UE 402 may apply an RV to the MSG3 retransmission 412 as indicated by the RV information element signaled to the UE 402 as a portion of the MSG3 retransmission request 410.

The UE 402 may send multiple retransmissions of MSG3 if it does not receive the MSG4 transmission 414. In some existing networks, this issue may be somewhat frequent, due to unreliable MSG3 reception at a gNB. And when a UE employs multiple retransmissions of MSG3, this can result in an increased latency of the RACH procedure.

According to an aspect of the present disclosure, a UE may employ MSG3 repetition (described further below) to improve MSG3 reliability and extend MSG3 coverage in a given cell. In some examples, a UE may employ MSG3 repetition only for UE retransmission of MSG3; while in other examples, a UE may employ MSG3 repetition for both an initial MSG3 transmission and for MSG3 retransmissions.

In a further aspect of the present disclosure, to potentially even further improve MSG3 reliability and improve MSG3 coverage, a UE may apply different RVs in respective repetitions of MSG3. Some aspects of the present disclosure relate to UE determination of which RV to use for a given repetition in a transmission (and/or retransmission) of MSG3 that employs MSG3 repetition.

Figure 5:
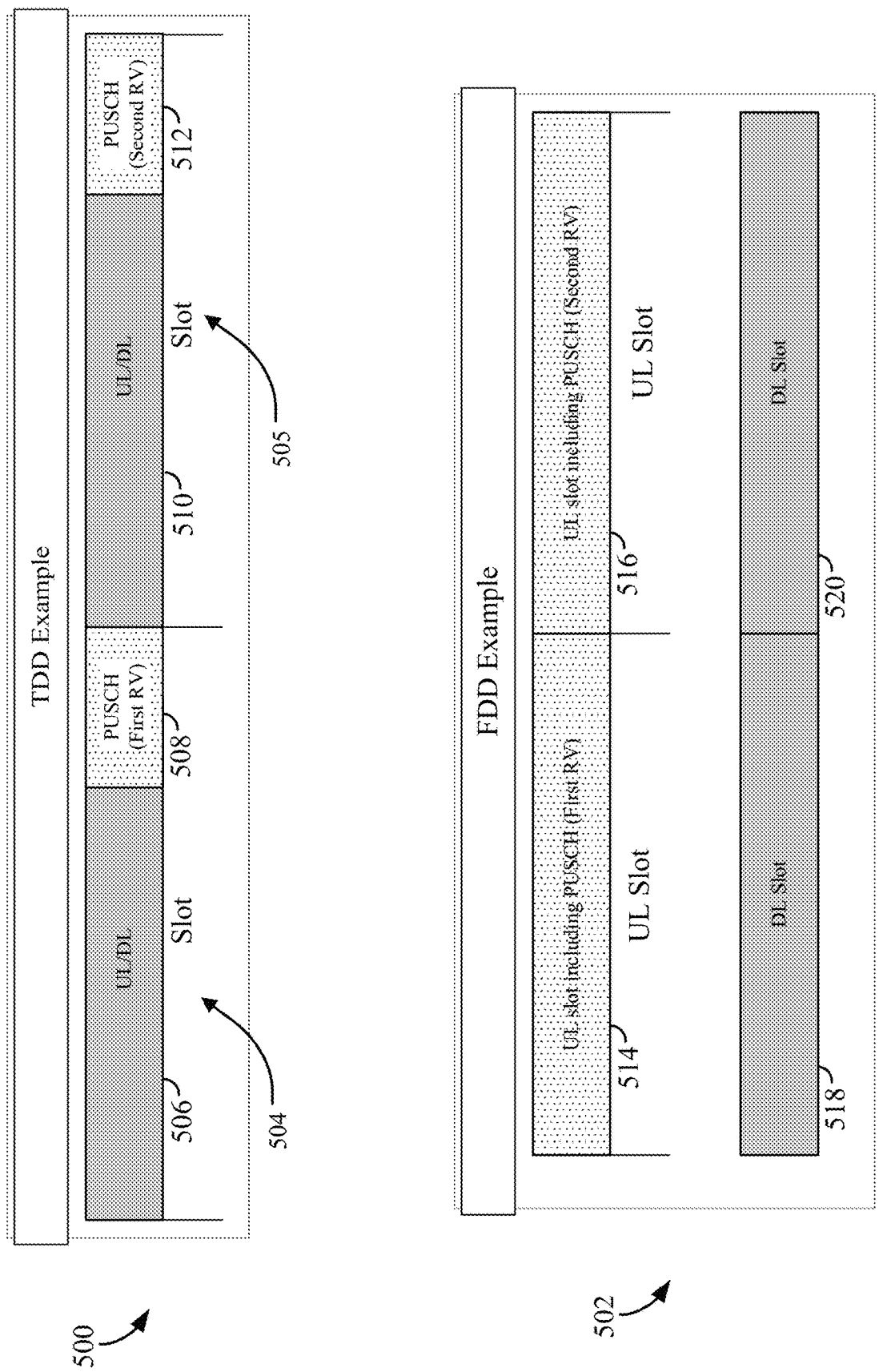
FIG. 5 is a conceptual illustration of frequency division duplex (FDD) and time division duplex (TDD) examples having an uplink transmission (or retransmission) including multiple repetitions of a message according to a relevant RV pattern, according to some embodiments of the disclosure.

For example, FIG. 5 shows a conceptual illustration of a transmission (e.g., a MSG3 transmission). In some deployments, as shown, the transmission can include multiple (e.g., two or more) repetitions of a given packet or message. In some scenarios, the repetitions may employ an RV corresponding to an RV pattern. Additionally or alternatively, some used RVs may be determined via an RV pattern that may correspond to respective packets or messages in the repetitions. For example, a first example 500 shows such a transmission on a time division duplex (TDD) carrier. A second example 502 shows such a transmission on a frequency division duplex (FDD) carrier. As described further below, a UE may determine a suitable RV pattern for a transmission including multiple repetitions of a particular message, e.g., by transmitting respective repetitions on a physical uplink shared channel (PUSCH) in multiple corresponding slots.

In example 500, two slots labeled 504 and 505 are shown on the TDD carrier. The first slot 504 includes a first region 506 (which can include uplink, downlink, or a suitable combination of these), and an uplink burst region 508. The uplink burst region 508 may include a PUSCH on which a given UE has a resource assignment or grant for an uplink transmission. As illustrated, a second slot 505 has a similar format, including a first region 510 and an uplink burst region 512. According to an aspect of the present disclosure, a UE may transmit multiple repetitions of a given packet or message on PUSCHs in respective slots according to the determined RV pattern.

Although the slots 504, 505 are illustrated as being contiguous, in other examples these slots may not be contiguous. That is, a gap of one or more slots may appear between repetitions of a transmitted message as described herein. Additionally, although only two slots 504, 505 for the example 500 are illustrated, in other examples, the UE can transmit any suitable number r of repetitions across a set of slots corresponding with a suitable RV pattern.

In example 502, the uplink component carrier of the FDD carrier includes two uplink slots 514 and 516, and the downlink component carrier includes two downlink slots 518 and, 520. The first uplink slot 514 may include a PUSCH on which a given UE has a resource assignment or grant for an uplink transmission. According to an aspect of the present disclosure, a UE may transmit multiple repetitions of a given packet or message on PUSCHs in respective uplink slots according to the determined RV pattern. Similar to the example 500, in example 502, although the uplink slots 514, 516 are illustrated as being contiguous, in other examples these UL slots may not be contiguous. That is, a gap of one or more slots may appear between repetitions of a transmitted message as described herein. Additionally, although only two uplink slots 514, 516 for the example 502 are illustrated, in other examples, the UE can transmit any suitable number of repetitions r corresponding with a determined RV pattern.

RV Pattern Determination for Transmission Repetitions

Figure 6:
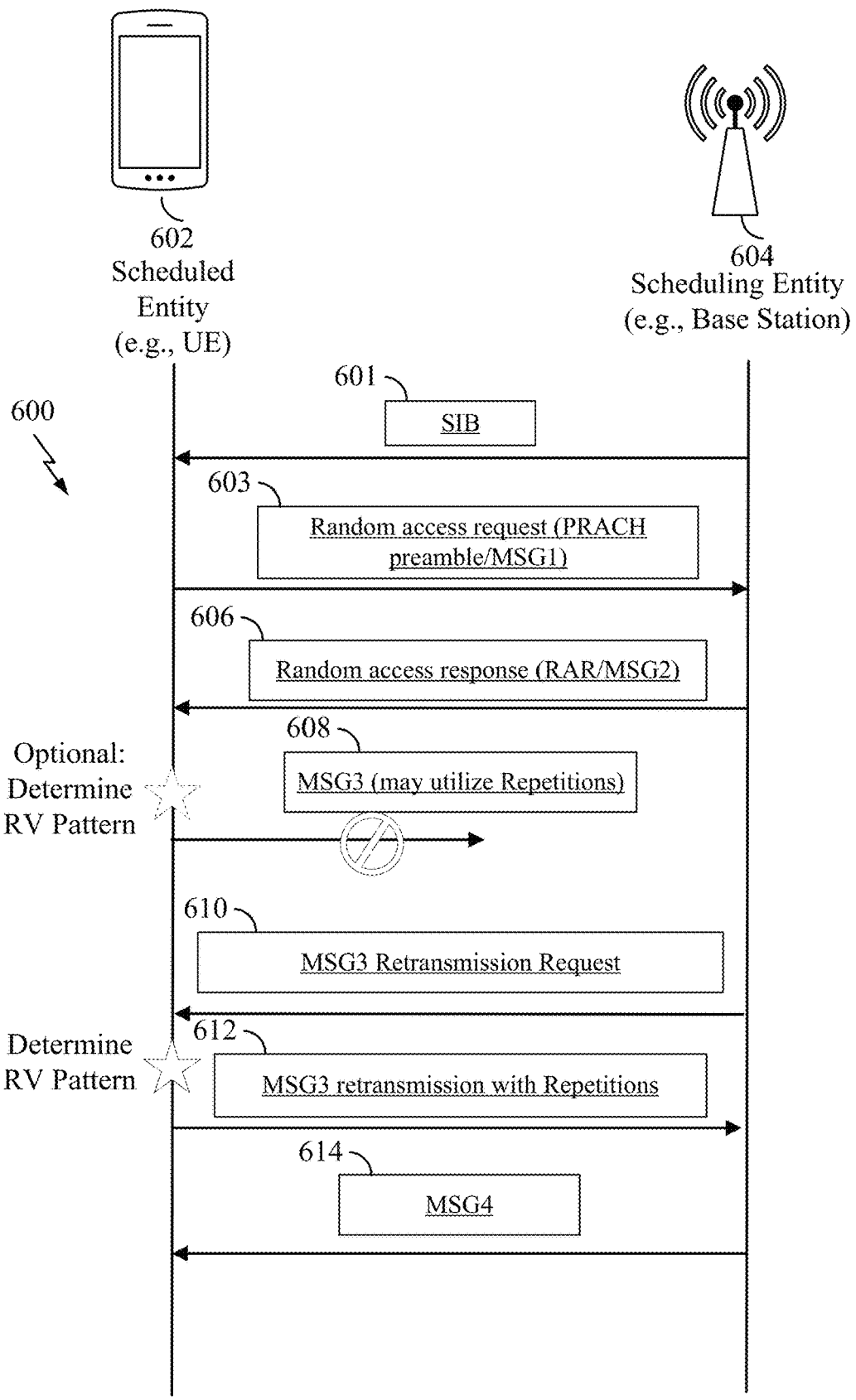
FIG. 6 is a call flow diagram illustrating a random access procedure employing message repetitions in accordance with some embodiments.

According to various aspects of the present disclosure, as described above, a UE may employ repetitions for a given transmission (e.g., MSG3 of a RACH procedure). The repetitions may be defined according to a determined RV pattern. Here, an RV pattern refers to a sequence or series of r RVs. In some scenarios, a given RV pattern may include any suitable number r of RVs, where r is an integer of two (2) or greater. Other r values may be used as desired or for operational performance characteristics of interest. FIG. 6 is a call flow diagram 600 of an exemplary random access process involving a UE 602 and a base station 604, in which a UE 602 employs MSG3 repetition according to some aspects of the present disclosure.

As illustrated, a UE 602 may receive system information (e.g., via a system information block, SIB) 601 from the base station 604. For example, the base station 604 may periodically broadcast the system information over a corresponding cell, and or the UE 602 may request an on-demand transmission of the system information. The SIB can contain system information that includes cell access information that, when received by the UE 602, may enable the UE 602 to begin a random access procedure. In some aspects of this disclosure, a system information message (e.g., SIB) may further include a RV configuration message, as described further below in connection with FIG. 9. For example, a UE may employ an RV configuration message received in a system information message to configure an RV pattern for an initial MSG3 transmission and/or a MSG3 retransmission.

The UE 602 may transmit a random access request, or RACH preamble 603 to the base station 604 over a physical random access channel (PRACH). This message 603 may equivalently be referred to as Message 1 (MSG1). If base station 604 receives MSG1 603, the base station 604 can derive a random access-radio network temporary identifier (RA-RNTI) corresponding to the UE 602 (e.g., based on MSG1 603).

If the base station 604 properly receives and decodes the MSG1 transmission, then in response, the base station 604 may transmit a random access response 606 to the UE. For example, the base station 604 may transmit a PDCCH including a DCI with a CRC scrambled by the RA-RNTI; a DCI for scheduling a corresponding PDSCH; and the corresponding PDSCH, including the RAR, equivalently referred to as Message 2 (MSG2). In various examples, the DCI for scheduling the PDSCH carrying RAR message 606 may utilize DCI format 1_0. Among other things, this random access response message 606 may provide the UE 602 with a grant or scheduling information indicating UL resources for the UE 602 to use for an UL transmission (e.g., for MSG3). Furthermore, this random access response message 606 may provide the UE 602 with a TC-RNTI. The UE 602 may employ the TC-RNTI in subsequent phases of the random access procedure of the call flow 600, described further below.

Thus, after transmitting MSG1 603, the UE 602 may monitor for a random access response message 606 from the base station 604. That is, the UE 602 may monitor for a PDCCH including a DCI with a CRC scrambled by the RA-RNTI. However, if the base station 604 does not properly receive or decode the MSG1 transmission, then the base station 604 may not transmit such a response. Here, if the UE 602 does not receive its expected response, e.g., after a suitable timeout period, the UE 602 may retransmit MSG1 603 one or more subsequent times.

In the illustrated call flow 600, the UE 602 receives a random access response message 606 from the base station 604. Here, the random access response message 606 may include a PDCCH that carries a DCI with a CRC scrambled by the RA-RNTI.

In some aspects, a UE 602 may be configured not to utilize or employ MSG3 repetition as described herein for an initial MSG3 transmission 608. In such an example, the UE 602 may utilize an RV that the base station 604 signaled to the UE 602, e.g., in the random access response message 606. That is, in some examples, in the random access response message 606, the base station 604 may provide an RV information element that the UE 602 may utilize for an initial, non-repeating MSG3 transmission.

And still further, corresponding to a RACH procedure where MSG3 repetition is supported for an initial MSG3 transmission, the random access response message 606 may provide the UE with an RV configuration message, as described further below in connection with FIG. 9. For example, the DCI for scheduling the PDSCH carrying RAR message 606 may utilize DCI format 1_0, and the RV configuration message may be indicated utilizing one or more bits (e.g., reserved bits in existing specifications) in DCI format 1_0. In particular, a DCI of format 1_0 may include a set of 14 or 16 reserved bits, in different configurations, according to existing specifications for 3GPP 5G NR. Thus, a base station or gNB may employ a set of one or more of these otherwise reserved bits as repurposed bits to provide the UE with an RV configuration message.

When the UE 602 receives the random access response 606, the UE may then transmit message 3 (MSG3) 608 of the random access procedure. Here, MSG3 may include any suitable information, and in some examples, may be located on a PUSCH. Here, the UE 602 may utilize resources corresponding to the UL grant received in the DCI in the RAR message 606.

In some examples, the UE 602 may determine an RV pattern and employ repetition for the initial MSG3 transmission 608, as described further below in connection with FIG. 9. In other examples, however, the UE 602 may not implement repetition for the initial MSG3 transmission 608, and may transmit an initial MSG3 transmission without repetition as disclosed herein.

After transmitting MSG3 608, the UE 602 may monitor for a PDCCH transmission from the base station 604. Here, if the base station 604 correctly receives and decodes MSG3 608, the base station 604 may transmit message 4 (MSG4) of the corresponding random access procedure. Such MSG4 transmission may include a PDCCH including a DCI with a CRC scrambled by the TC-RNTI indicated in the random access response message 606. This transmission may further include a corresponding PDSCH, carrying MSG4.

In some cases, such as the scenario illustrated in FIG. 6, the base station 604 may not correctly receive or decode MSG3 608. In some cases, base station 604 may determine, after a period of time of not properly receiving (and decoding) MSG3 608, to transmit the MSG3 retransmission request 610. In other configurations, the base station 604 can determine whether to request the retransmission of MSG3, based on other parameters and conditions (e.g., the amount of the MSG3 properly decoded, etc.).

Accordingly, the base station 604 may transmit a request for UE retransmission of MSG3. In some configurations, the MSG3 retransmission request message 610 may include a PDCCH that carries a DCI with a CRC scrambled by the TC-RNTI indicated in the random access response message 606.

According to an aspect of the disclosure, corresponding to a RACH procedure where MSG3 repetition is not supported for an initial MSG3 transmission 608, and is only supported for a MSG3 retransmission, the MSG3 retransmission request message 610 may provide the UE with an RV configuration message, as described further below in connection with FIG. 9. For example, the DCI in MSG3 retransmission request message 610 may utilize DCI format 0_0. According to existing 3GPP specifications for 5G NR, DCI format 0_0 includes (among other things) the following information: 1 (reserved) bit identified as a New Data Indicator; 2 bits to indicate a Redundancy Version (RV information element), and 4 (reserved) bits identified as a HARQ process number. Accordingly, the base station or gNB may indicate the RV configuration message to the UE utilizing one or more bits (e.g., a repurposed 1-bit New Data Indicator and/or a 4-bit HARQ Process Number) as repurposed bits in DCI format 0_0 or using the redundancy version field in DCI format 0_0.

According to an aspect of the disclosure corresponding to a RACH procedure where MSG3 repetition is supported for an initial MSG3 transmission 608, as well as for a MSG3 retransmission 612, a UE receiving a MSG3 retransmission request 610 may already have an existing RV configuration and a determined RV pattern for MSG3 repetition, corresponding to the initial MSG3 transmission 608 (and/or corresponding to a system information message 601). Here, in some examples, such a UE may continue to employ this existing RV configuration and determined RV pattern for the MSG3 retransmission 612.

However, in another example, a base station or gNB may overwrite such an existing RV configuration and/or determined RV pattern, and signal to the UE a new RV configuration and/or RV pattern indication by employing DCI format 0_0 for the MSG3 retransmission request message 610. For example, the DCI in MSG3 retransmission request message 610 may utilize DCI format 0_0, and the RV configuration message may be indicated utilizing one or more bits (e.g., a repurposed 1-bit New Data Indicator and/or a 4-bit HARQ Process Number) in DCI format 0_0.

In the MSG3 retransmission request message 610, the base station 604 may further include a resource allocation or grant for time-frequency resources for the UE 602 to utilize for a corresponding MSG3 retransmission.

In response to the MSG3 retransmission request 610, the UE 602 may transmit a MSG3 retransmission 612. According to an aspect of the present disclosure, the UE 602 may determine an RV pattern and employ repetition for the MSG3 retransmission 612, as described further below in connection with FIG. 9.

This procedure may repeat multiple times, with the UE 602 sending multiple retransmissions of MSG3 if it does not receive the MSG4 transmission 614. In the illustrated example, the base station 604 transmits a MSG4 transmission 614 after properly receiving and decoding the MSG3 retransmission 612.

Figure 7:
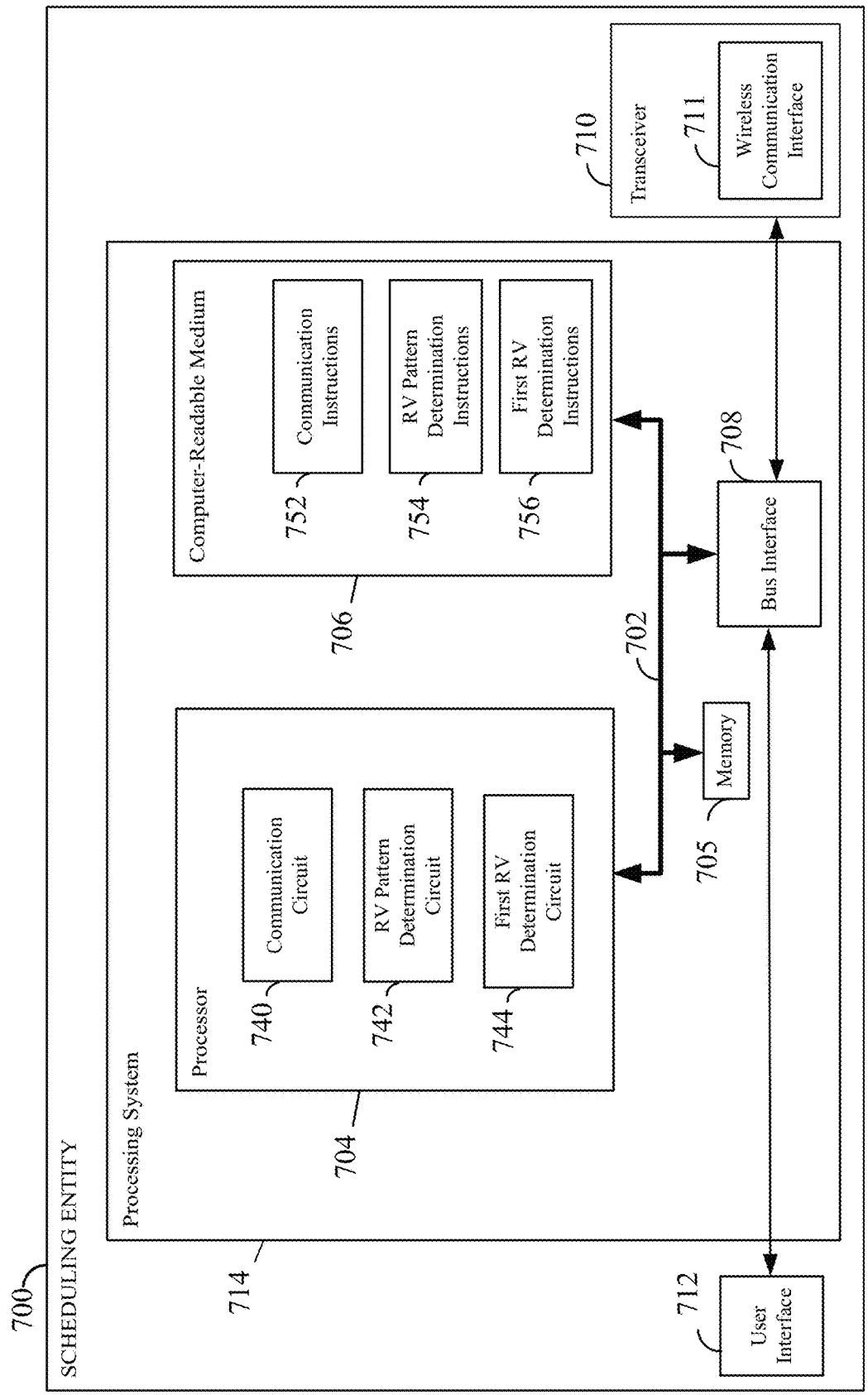
FIG. 7 is a block diagram conceptually illustrating an example of a hardware implementation for a scheduling entity according to some embodiments of the disclosure.

FIG. 7 is a block diagram illustrating an example of a hardware implementation for a scheduling entity 700 employing a processing system 714. For example, the scheduling entity 700 may be a user equipment (UE) as illustrated in any one or more of FIGS. 1, 2, 4, and/or 6. In another example, the scheduling entity 700 may be a base station as illustrated in any one or more of FIGS. 1, 2, 4, and/or 6.

The scheduling entity 700 may include a processing system 714 having one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 700 may be configured to perform any one or more of the functions described herein. That is, the processor 704, as utilized in a scheduling entity 700, may be configured (e.g., in coordination with the memory 705) to implement any one or more of the processes and procedures described below and illustrated in FIGS. 6, 9, 10, and/or 11.

The processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a transmission medium. Depending upon the nature of the apparatus, a user interface 712 (e.g., keypad, display, speaker, microphone, joystick) may also be provided. Of course, such a user interface 712 is optional, and some examples, such as a base station, may omit it.

In some aspects of the disclosure, the processor 704 may include communication circuitry 740 configured (e.g., in coordination with the memory 705) for various functions, including, for example, configuring and/or transmitting on a downlink traffic channel and/or downlink control channel Additionally, communication circuitry 740 can be configured for transmitting system information (including cell access information), such as in a system information block (SIB). For example, the communication circuitry 740 may be configured to implement one or more of the functions described below in relation to FIGS. 6, 9, 10, and/or 11, including, e.g., blocks 601, 606, 610, 614, 1102, 1104, 1108, and/or 1112 (when the scheduling entity 700 is implementing a base station) and blocks 603, 608, 612, 902, 904, 908, 910, 1004, 1008, and 1010 (when the scheduling entity 700 is implementing a UE). The processor 704 may further include RV pattern determination circuitry 742, which can determine the RV pattern for transmission to the UE (e.g., based on a RV information element, an RV configuration message, and/or an RV sequence or table of RV sequences saved in memory 705, and/or the computer-readable medium 706) and for decoding transmission from the UE. For example, the RV pattern determination circuitry 742 may be configured to implement one or more of the functions described below in relation to FIGS. 6, 9, 10, and/or 11, including, e.g., blocks 904, 905, 906, 912, and/or 1008 (when the scheduling entity 700 is implementing a UE) and including blocks 1108 and/or 1110 (when the scheduling entity 700 is implementing a base station). Additionally, the processor 704 can further include first RV determination circuit 744, which can determine a first or initial RV within a selected RV pattern. For example, the first RV determination circuit 744 can determine which is to be the first RV within the RV pattern. For example, the first RV determination circuit 744 may be configured to implement one or more of the functions described below in relation to FIGS. 6, 9, 10, and/or 11, including, e.g., at least a portion of one or more of the blocks 904, 905, 906, and 1008 (when the scheduling entity 700 is implementing a UE) and including block 1108 (when the scheduling entity 700 is implementing a base station).

The processor 704 is responsible for managing the bus 702 and general processing, including the execution of software stored on the computer-readable medium 706. The software, when executed by the processor 704, causes the processing system 714 to perform the various functions described below for any particular apparatus. The processor 704 may also use the computer-readable medium 706 and the memory 705 for storing data that the processor 704 manipulates when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 706. The computer-readable medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 706 may store computer-executable code that includes communication instructions 752 that configure a scheduling entity 700 for various functions, including, e.g., configuring and/or transmitting on a downlink traffic channel and/or downlink control channel, receiving on an uplink traffic channel and/or uplink control channel Additionally, communication instructions 752 can be configured for transmitting system information (including cell access information), such as in a system information block (SIB). For example, the communication instructions 752 may be configured to cause a scheduling entity 700 to implement one or more of the functions described below in relation to FIGS. 6, 9, 10, and/or 11, including, e.g., blocks 601, 606, 610, 614, 1102, 1104, 1108, and/or 1112 (when implementing a base station) and blocks 603, 608, 612, 902, 904, 910, 1004, 1008, and 1010 (when implementing a UE). As further shown in FIG. 7, the computer-readable storage medium 706 can include RV pattern determination instructions 754 for instructing, appropriately, the RV pattern determination circuit 742, and can include first RV determination instructions 756 for instructing, appropriately, the first RV determination circuit 744. For example, the RV pattern determination instructions 754 may be configured to cause a scheduling entity 700 to implement one or more of the functions described below in relation to FIGS. 6, 9, 10, and/or 11, including, e.g., blocks 904, 905, 906, 912, and 1008 (when the scheduling entity 700 is implementing a UE) and including blocks 1108 and/or 1110 (when the scheduling entity 700 is implementing a base station). For example, the first RV determination instructions 756 may be configured to cause a scheduling entity 700 to implement one or more of the functions described below in relation to FIGS. 6, 9, 10, and/or 11, including, e.g., at least a portion of one or more of the blocks 904, 905, 906, and 1008 (when the scheduling entity 700 is implementing a UE) and including block 1108 (when the scheduling entity 700 is implementing a base station).

In one configuration, the scheduling entity 700 includes means for transmitting on a downlink traffic channel and/or downlink control channel, means for receiving on an uplink traffic channel and/or uplink control channel, means for determining an RV pattern, and means for determining a first RV within a relevant RV pattern. In one aspect, the aforementioned means may be the processor(s) 704 shown in FIG. 7 configured to perform the functions recited by the aforementioned means. In another aspect, the aforementioned means may be a circuit or any apparatus configured to perform the functions recited by the aforementioned means.

Figure 9:
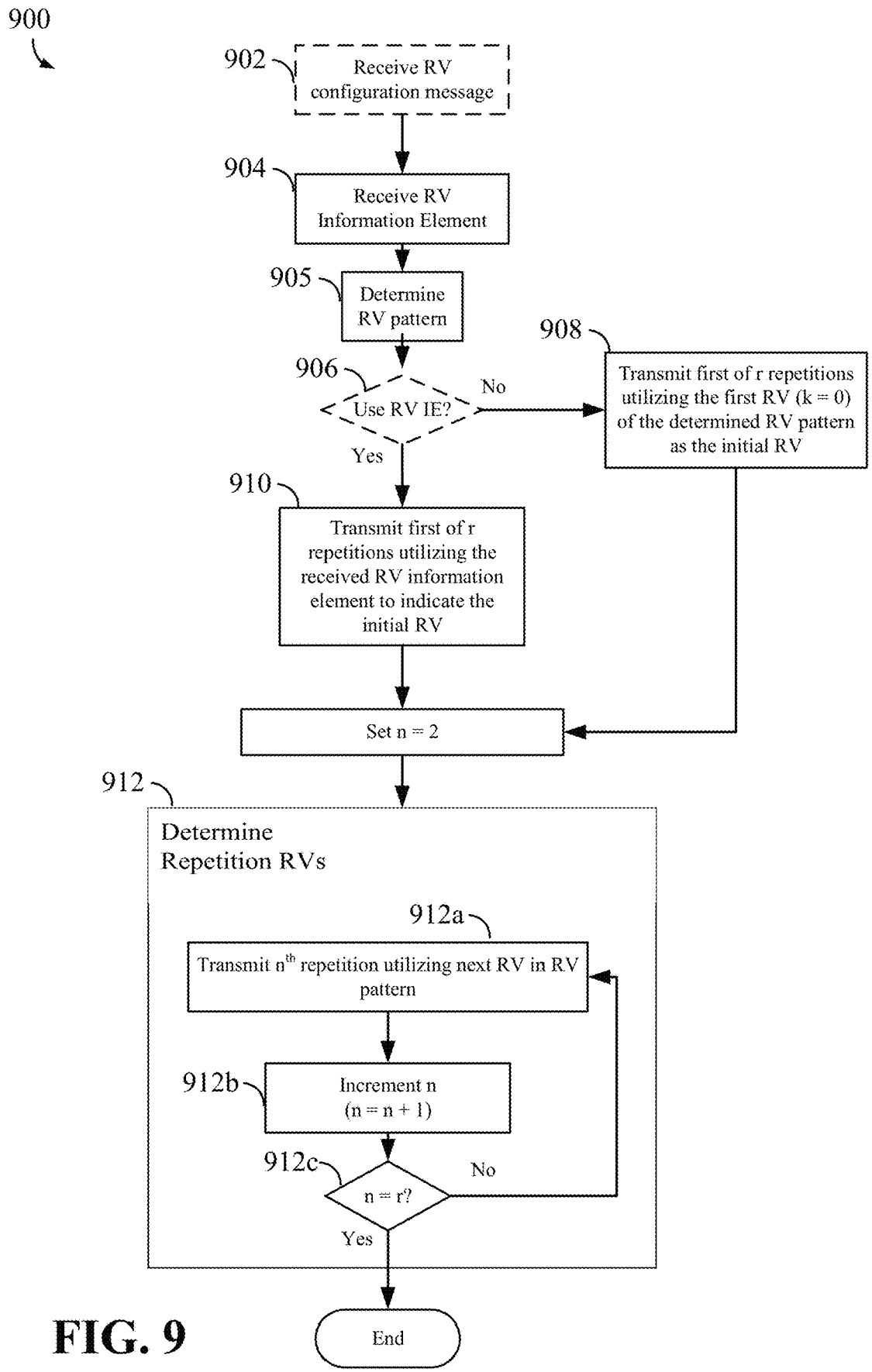
FIG. 9 is a flow chart illustrating an exemplary process for a random access procedure according to some embodiments of the disclosure.
Figure 10:
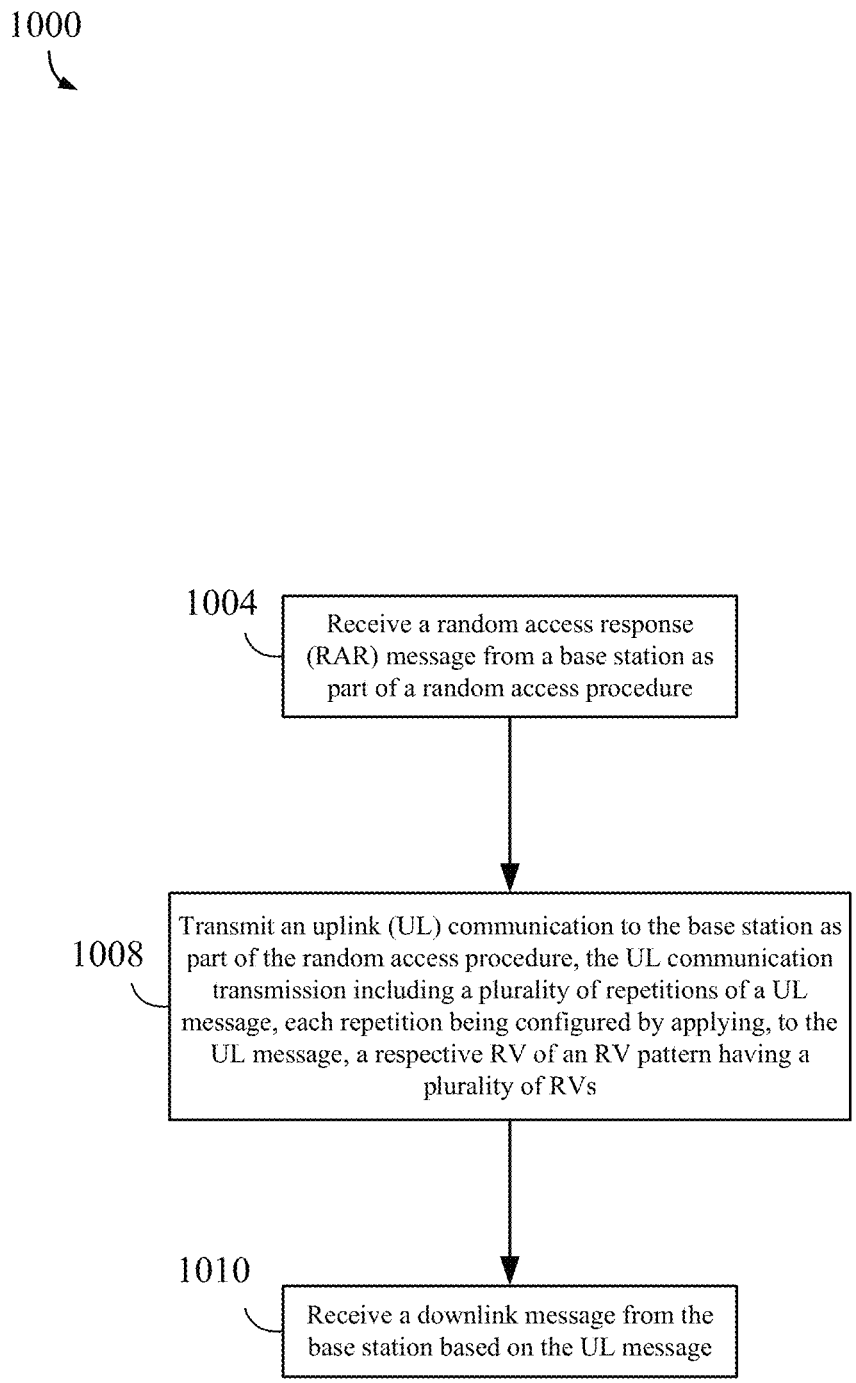
FIG. 10 is a flow chart illustrating another exemplary process for a random access procedure according to some embodiments of the disclosure.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIGS. 1, 2, 4, 6, 7, and/or 8, and utilizing, for example, the processes and/or algorithms described herein in relation to FIGS. 6, 9, 10, and/or 11.

Figure 8:
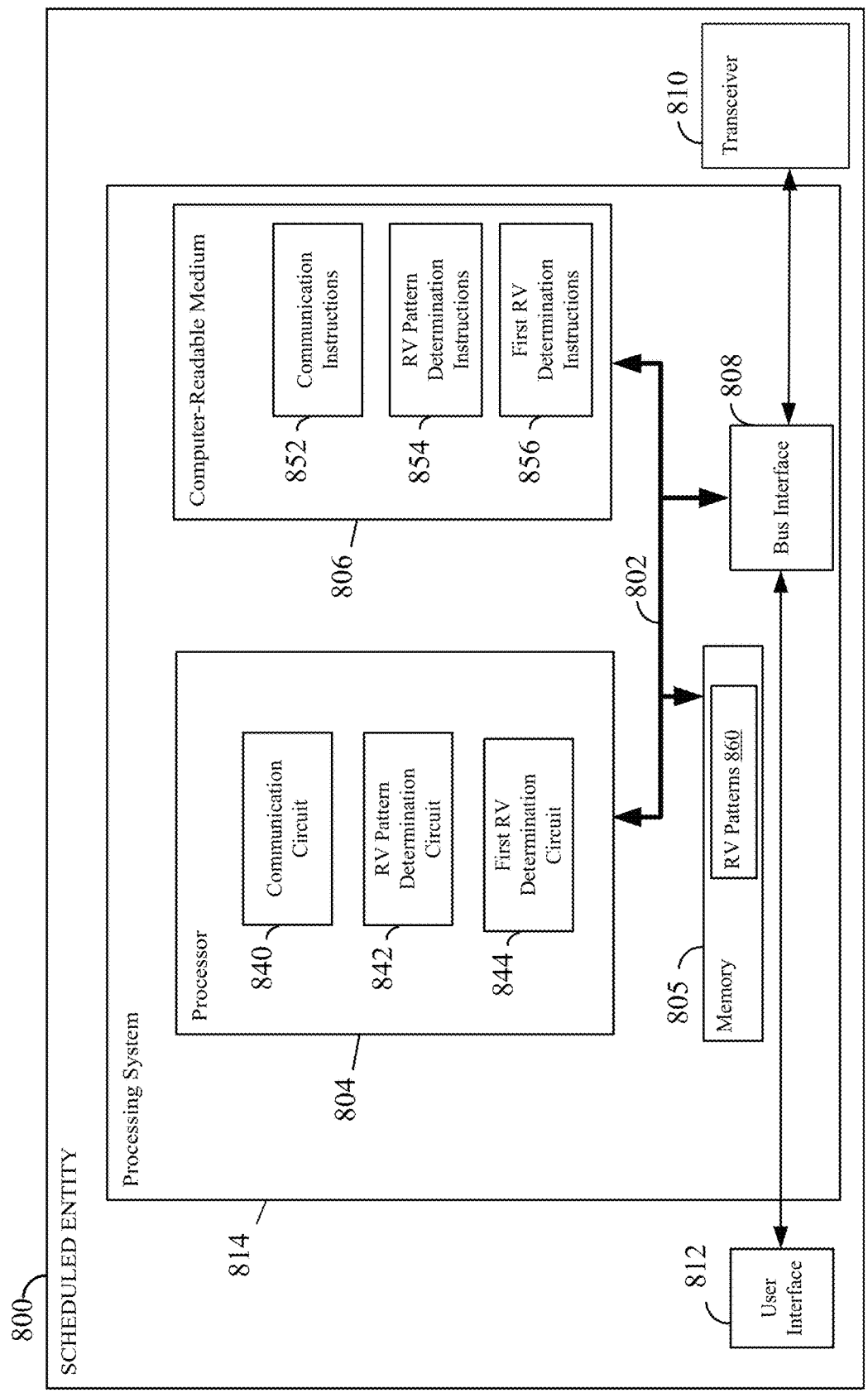
FIG. 8 is a block diagram conceptually illustrating an example of a hardware implementation for a scheduled entity according to some embodiments of the disclosure.

FIG. 8 is a conceptual diagram illustrating an example of a hardware implementation for an exemplary scheduled entity 800 employing a processing system 814. In accordance with various aspects of the disclosure, a processing system 814 may include an element, or any portion of an element, or any combination of elements having one or more processors 804. For example, the scheduled entity 800 may be a user equipment (UE) as illustrated in any one or more of FIGS. 1, 2, 4, and/or 6.

The processing system 814 may be substantially the same as the processing system 714 illustrated in FIG. 7, including a bus interface 808, a bus 802, memory 805, a processor 804, and a computer-readable medium 806. Furthermore, the scheduled entity 800 may include a user interface 812 and a transceiver 810 substantially similar to those described above in FIG. 7. That is, the processor 804, as utilized in a scheduled entity 800, may be configured (e.g., in coordination with the memory 805) to implement any one or more of the processes described below and illustrated in FIGS. 6, 9, and/or 10.

In some aspects of the disclosure, the processor 804 may include communication circuitry 840 configured (e.g., in coordination with the memory 805) for various functions, including, e.g., transmitting (e.g., via the transceiver 810) on an uplink traffic channel and/or an uplink control channel, and/or receiving (e.g., via the transceiver 810) on a downlink traffic channel and/or a downlink control channel. For example, the communication circuitry 840 may be configured to implement one or more of the functions described below in relation to FIGS. 6, 9, and/or 10, including e.g., blocks 603, 608, 612, 902, 904, 908, 910, 1004, 1008, and 1010. The processor 804 can further include an RV pattern determination circuit 842 for determining an RV pattern intended for the scheduled entity (e.g., from the RV information element and/or one or more RV information elements stored in memory), and can include a first RV determination circuit 844 for determining the desired RV to begin with, within a relevant RV pattern (e.g., as determined by the second index value). For example, the RV pattern determination circuitry 842 may be configured to implement one or more of the functions described below in relation to FIGS. 6, 9, and/or 10, including, e.g., blocks 904, 905, 906, 912, and 1008. For example, the first RV determination circuit 844 may be configured to implement one or more of the functions described below in relation to FIGS. 6, 9, and/or 10, including, e.g., at least a portion of one or more of the blocks 904, 905, 906, and 1008.

And further, the computer-readable storage medium 806 may store computer-executable code that includes communication instructions 852 that configure a scheduled entity 800 for various functions, including, e.g., transmitting on an uplink traffic channel and/or an uplink control channel; and/or receiving and demodulating a downlink traffic channel and/or a downlink control channel (e.g., via the transceiver 810). For example, the communication instructions 852 may be configured to cause a scheduled entity 800 to implement one or more of the functions described below in relation to FIGS. 6, 9, and/or 10, including, e.g., blocks 603, 608, 612, 902, 904, 910, 1004, 1008, and 1010. As shown in FIG. 8, the computer-readable storage medium 806 can include RV pattern determination instructions 854 for instructing, appropriately, the RV pattern determination circuit 842, and can include first RV determination instructions 856 for instructing, appropriately, the first RV determination circuit 844. For example, the RV pattern determination instructions 854 may be configured to cause a scheduled entity 800 to implement one or more of the functions described below in relation to FIGS. 6, 9, and/or 10, including, e.g., blocks 904, 905, 906, 912, and 1008. For example, the first RV determination instructions 856 may be configured to cause a scheduled entity 800 to implement one or more of the functions described below in relation to FIGS. 6, 9, and/or 10, including, e.g., blocks 904, 905, 906, and 1008.

In some examples, the memory 805 further includes one or more RV patterns 860. Each of the RV patterns 860 may be associated with an RV identifier such that the processor 804 may selectively access an RV pattern from the one or more RV patterns 860 in the memory 805.

In one configuration, the scheduled entity 800 includes means for transmitting on an uplink traffic channel and/or uplink control channel; means for receiving and demodulating a downlink traffic channel and/or downlink control channel, means for determining an RV pattern, and means for determining a first RV within a relevant RV pattern. In one aspect, the aforementioned means may be the processor(s) 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1, 2, 4, 6, 7, and/or 8, and utilizing, for example, the processes and/or algorithms described herein in relation to FIGS. 6, 9, and/or 10.

FIG. 9 is a flow chart illustrating an exemplary process 900 for RV pattern determination and message transmission employing repetition in accordance with some aspects of the present disclosure. As described below, a particular implementation may omit some or all illustrated features, and may not require some illustrated features to implement all embodiments. In some examples, the scheduled entity 800 illustrated in FIG. 8 may be configured to carry out the process 900. In some examples, any suitable apparatus or means for carrying out the functions or algorithm described below may carry out the process 900.

In some examples, a UE's RV pattern determination process may employ a fixed, static, or predetermined RV pattern, e.g., stored in memory in the UE. For example, such a fixed pattern may be agreed and specified in relevant specifications or standards. Using a fixed pattern can reduce communications between a base station and UE, and can result in a more efficient RV determination process in terms of reduced processing. In some further examples, a UE may select an RV pattern from among a plurality of available RV patterns (e.g., stored in a table in memory). In this example, a base station or gNB may signal a suitable RV pattern selection information element to indicate to the UE which RV pattern to select for a corresponding transmission from among the plurality of available RV patterns 860. And in still other examples, a UE may determine an RV pattern in any suitable manner based on signaling received from a base station or gNB. In one particular example, a UE may receive an explicit indication of an RV pattern signaled from a base station, to indicate an RV pattern for a UE to use for a corresponding transmission. And in still further examples, a base station 604 may signal a repetition enabling indication to indicate whether a UE should use repetition for a corresponding transmission.

In a further aspect of this disclosure, a number of repetitions r for a given transmission that employs repetition as described herein need not be the same number as the number of RVs in an RV pattern applied to that transmission. For example, a UE may cyclically repeat a determined pattern until it transmits a given number of repetitions r. Thus, in a still further aspect of the present disclosure, a base station or gNB may signal a number-of-repetitions information element to indicate a number r of repetitions (e.g., MSG3 repetitions) for the UE to transmit in a corresponding transmission.

In various examples, at block 902, a base station or gNB may provide a UE with one or more such RV configuration parameters in an RV configuration message. That is, a base station or gNB may transmit an RV configuration message to a UE, including, for example, any one of, or any suitable combination of, an RV pattern selection information element, an explicit indication of an RV pattern, a repetition enabling indication, and/or a number-of-repetitions information element.

For example, a base station may include such an RV configuration message within a DCI. For example, as described above, the DCI the base station transmits in connection with the MSG3 retransmission request 610 may utilize DCI of format 0_0, and the RV configuration message may be indicated utilizing one or more bits (e.g., reserved bits in existing specifications) in DCI format 0_0. In particular, a DCI of format 0_0 may include reserved fields such as a 1-bit new data indicator and a 4-bit HARQ process number indicator. Accordingly, one or more of these otherwise reserved bits may be repurposed for a base station or gNB to use to signal to a UE an RV configuration message including one or more RV configuration parameters, as described above.

In another example, as described above corresponding to a RACH process of the call flow 600 where transmission repetition as disclosed herein is enabled for an initial MSG3 transmission 608, the DCI the base station transmits in connection with RAR message 606 may utilize DCI format 1_0, and the RV configuration message may be indicated utilizing one or more bits (e.g., reserved bits in existing specifications) in DCI format 1_0. In particular, a DCI of format 1_0 may include a set of 14 or 16 reserved bits, in different configurations, according to existing specifications for 3GPP 5G NR. Thus, a base station or gNB may employ a set of one or more of these otherwise reserved bits as repurposed bits to provide the UE with an RV configuration message.

Thus, a base station or gNB may include such an RV configuration message in a DCI carried in a PDCCH in connection with a random access response message 606. Accordingly, a UE may determine an RV repetition configuration for an initial MSG3 transmission 608 based on the received RV configuration message. And in some examples, if a determined RV repetition configuration is not overwritten via a MSG3 retransmission request, a UE may determine an RV repetition configuration for a MSG3 retransmission 612 based on the received RV configuration message in the DCI carried in the PDCCH in connection with the random access response message 606.

Similarly, a base station or gNB may include such an RV configuration message in a DCI carried in a PDCCH in connection with a MSG3 retransmission request 610. Accordingly, a UE may determine an RV repetition configuration for a MSG3 retransmission 612 based on the received RV configuration message.

In a further aspect of the disclosure, at block 904, a base station or gNB may signal an RV information element to a UE to indicate a first RV for the UE to apply to a first message transmission (e.g., the first or initial of multiple repetitions). For example, as described above in relation to FIG. 6, a base station 604 may signal a MSG3 retransmission request 610 to a UE by transmitting a PDCCH having a DCI with CRC scrambled by the TC-RNTI, where the DCI is format 0_0. Once again, such a DCI format 0_0 includes a two-bit RV information element in existing 3GPP specifications for 5G NR (e.g., a two-bit redundancy version field in DCI format 0_0). According to an aspect of the present disclosure, a UE may utilize such an RV information element as an indication of an RV to apply to a first repetition out of a plurality of repetitions of a given transmission (e.g., MSG3 retransmission 612).

And in some examples, a base station 604 may signal a RAR/MSG2 606 by transmitting a PDCCH having a DCI with CRC scrambled by the RA-RNTI, where the DCI is format 1_0. According to a further aspect of the present disclosure, one or more otherwise reserved bits in existing 3GPP specifications for 5G NR may be repurposed to indicate an RV information element. According to an aspect of the present disclosure, a UE may utilize such an RV information element as an indication of an RV to apply to a first repetition out of a plurality of repetitions of a given transmission (e.g., initial MSG3 transmission 608, and if not overwritten, MSG3 retransmission 612).

Accordingly, at block 905, a UE may determine an RV pattern. Here, a UE may determine an RV pattern based on, e.g., any one of, or any suitable combination of, a fixed, static, or predetermined pattern stored in memory in a UE; an RV pattern selection information element in combination with a plurality of available RV patterns; an explicitly signaled RV pattern; a repetition enabling indication; and/or a number-of-repetitions information element, as described above.

At block 906, the UE determines whether to use the RV information element. In some examples, e.g., as shown at block 908, a UE may proceed and transmit a first of r repetitions utilizing a first RV of the RV pattern as the initial RV, applying the determined first RV to generate the first repetition of a transmission (e.g., of a MSG3 transmission and/or retransmission). For example, even in an example where a base station or gNB signals an RV information element to a UE (e.g., in a random access response message 606 and/or a MSG3 retransmission request 610), a UE may in some examples ignore such RV indication and directly apply the determined RV pattern without regard to such RV indication.

In other examples, at block 910, a UE may utilize the RV information element as an indication of an RV to apply to a first repetition out of a plurality of repetitions of a given transmission. That is, a UE may transmit a corresponding transmission utilizing repetition as described in this disclosure, applying an RV (also referred to as an initial or starting RV) corresponding to a received RV information element to a first or initial repetition of the message being transmitted or retransmitted.

Furthermore, at block 912, the UE may determine subsequent RVs to apply to subsequent repetitions after the first repetition based on the RV pattern and the RV information element. For example, a given RV pattern may indicate a sequence or set of RVs. In some examples, this RV pattern may include, within its set, an instance of each potential RV that a UE may apply to a given transmission. For example, if a given RV pattern has a length of x=4, the RV pattern may correspond to {0, 2, 3, 1}. Here, each potential RV from 0 to 3 that a UE may apply to a given transmission is included in the RV pattern. Accordingly, in a further aspect of the disclosure, a UE may identify an index k within the determined RV pattern where the RV corresponding to the received RV information element is located. For example, an RV pattern may be indexed according to an index k, according to an index pattern {0, 1, . . . x−1}. For example, in the exemplary RV pattern given above {0, 2, 3, 1}, the RV 0 corresponds to an index k=0; the RV 2 corresponds to an index k=1; the RV 3 corresponds to an index k=2; and the RV 1 corresponds to an index k=3. Further, an individual RV within an RV pattern may be indicated by RV {k} (e.g., the first RV in the RV pattern may be indicated by RV {0}, the second RV in the RV pattern may be indicated by RV {1}, and so on through R {x−1}.

Thus, in this example, if a UE determines an RV pattern of {0, 2, 3, 1}, and receives a 2-bit RV information element indicating [0b10], (e.g., 2), then the UE may identify an initial RV index corresponding to the received RV information element of 2, within the determined RV pattern, at an index k=1.

Accordingly, the first or initial repetition that the UE transmits may occur either in block 908 (applying, e.g., RV 0 having index k=0) or in block 910 (applying, e.g., RV 2 having index k=1 according to the received RV information element). To continue, at block 912, the UE may apply subsequent RVs to generate subsequent repetitions based on a cyclic application of the RV pattern, starting with the initial RV. For example, in block 912, the UE may loop through sub-blocks 912*a*, 912*b*, and 912*c* to, in each pass through the sub-blocks, apply the next RV in the RV pattern to the MSG3 to generate the next repetition, and then transmit the next repetition, until each of the r repetitions is transmitted (e.g., n=r). The RV pattern is applied cyclically such that the index k is incremented (e.g., k=k+1) with each pass through the sub-blocks 912*a-c* until, when the end of the RV pattern is reached (i.e., when index k=x−1), the next RV is the first RV in the RV pattern (i.e., index k=0). For example, in the exemplary RV pattern given above {0, 2, 3, 1}, when the initial RV is the first RV in the RV pattern (index k=0) and the number of repetitions r=6, the six repetitions may have the RVs applied in the following sequence:
  RV 0—block 908 or 910 with k=0, first transmission (n=1)
  RV 2—block 912, k=1, second transmission (n=2)
  RV 3—block 912, k=2, third transmission (n=3)
  RV 1—block 912, k=3, fourth transmission (n=4)
  RV 0—block 912, k=0, fifth transmission (n=5)
  RV 2—block 912, k=1, sixth transmission (n=6)

Accordingly, the index k is incremented with each transmission until the last index of the RV pattern (k=x−1) is reached, and then k may be reset to 0 for the subsequent transmission. In the above example, the initial RV is the first RV in the RV pattern (index k=0). In some embodiments, for an initial MSG3 transmission (see MSG3 608 in FIG. 6), the RV for the first repetition is the first RV in the RV pattern (index k=0) and the RVs for the repetitions cycle through the RV pattern starting from the first RV through the last RV in the RV pattern, and then wrapping around back to the first RV (as set out in the above example). In some examples, the first RV in the RV pattern (index k=0) is fixed (e.g., is not indicated by an RV information element provided by the base station), such as described with respect to blocks 906 and 908. In other examples, the first RV in the RV pattern (index k=0) is indicated by an RV information element provided by the base station (see, e.g., block 904, 906, and 910).

However, the initial RV may be an RV in the RV pattern other than the RV having index k=0. The index k of the initial RV may be indicated by an RV information element. For example, the UE may determine in block 910 that the initial RV is the RV of index k=2. Accordingly, in this example, and with the number of repetitions r=6 and the exemplary RV pattern given above {0, 2, 3, 1}, the six repetitions transmitted may have RVs applied in the following sequence, RV 3, RV 1, RV 0, RV 2, RV 3, RV 1. In some examples, for MSG3 retransmission (see MSG3 retransmission 612 in FIG. 6), the RV for the first repetition is the RV specified by the RV information element in block 904, and the UE transmits the first of r repetitions in block 910 with that specified RV.

The UE may continue through the process shown in block 912 until the number of repetitions transmitted n equals the number of repetitions to transmit r.

FIG. 10 is a flow chart illustrating an exemplary process 1000 for RV pattern determination and message transmission employing repetition in accordance with some aspects of the present disclosure. As described below, a particular implementation may omit some or all illustrated features, and may not require some illustrated features to implement all embodiments. In some examples, the scheduled entity 800 illustrated in FIG. 8 may be configured to carry out the process 1000. However, the process 1000 may also be implemented by other wireless communication devices. To simplify the discussion, the flow chart of FIG. 10 below is described with respect to the wireless communication devices of FIG. 6, i.e., the UE 602 (which may take the form of the scheduled entity 800 of FIG. 8) and the base station 604 (which may take the form of the scheduling entity 700). In some examples, any suitable apparatus or means for carrying out the functions or algorithm described below may carry out the process 1000.

At block 1004, the UE 602 receives a random access response (RAR) message from the base station 604 as part of a random access procedure. For example, with reference to FIG. 6, the UE 602 receives RAR/MSG2 606 from the base station 604. The RAR/MSG2 606 may be sent by the base station in response to initiation of the random access procedure by the UE 602. For example, the base station 604 may transmit the RAR/MSG2 606 in response to receipt and decoding of the random access request 603 (also referred to as a RACH preamble or Message 1 (MSG1)). With reference to FIG. 6, the UE 602 may transmit the MSG1 to the base station 604 over a physical random access channel (PRACH). The MSG1 603 indicates a request by the UE 602 to initiate a connection with the base station 604. As also noted with respect to FIG. 6, the RAR/MSG2 606 may include a PDCCH including a DCI with a CRC scrambled by the RA-RNTI; a DCI for scheduling a corresponding PDSCH; and the corresponding PDSCH. With reference to the scheduled entity 800 of FIG. 8 as an example of the UE 602, to receive the RAR message, the processor 804 may receive the RAR/MSG2 606 via the transceiver 810.

At block 1008, the UE 602 transmits an uplink (UL) communication to the base station 604 as part of the random access procedure. The UL communication includes a plurality of repetitions of a UL message, where each repetition is configured by applying, to the UL message, a respective redundancy version (RV) of an RV pattern that has a plurality of RVs. In some examples, the UL communication corresponds to the initial MSG3 transmission 608 of FIG. 6. For example, the UL communication transmitted by the UE 602 in block 1008 includes the initial MSG3 (e.g., in its entirety) along with repetitions of the MSG3. In further examples, the UL communication corresponds to the MSG3 retransmission 612 of FIG. 6 that is sent in response to receiving a retransmission request from the base station 604 (see MSG3 retransmission request 610). In these examples, the UL communication transmitted by the UE 602 in block 1008 is a UL communication retransmission that may include both the retransmitted MSG3 (e.g., MSG3 in its entirety) along with repetitions of MSG3, or that may include repetitions of MSG3, but without the full MSG3.

As part of block 1008, the UE 602 may determine the RV pattern. In some examples, the RV pattern is a fixed RV pattern (also referred to as a static or predetermined RV pattern), and the UE 602 determines the RV pattern by accessing a memory of the UE 602 that stores the fixed RV pattern. For example, with reference to the scheduled entity 800 of FIG. 8 as an example of the UE 602, to determine the RV pattern, the processor 804 may access a fixed RV pattern that is stored in the memory 805. Use of a fixed RV pattern can reduce communications and improve efficiency for the determination of the RV pattern. In some examples, the UE 602 determines the RV pattern based on information communicated by the base station 604 and received by the UE 602. With reference to the scheduled entity 800 of FIG. 8 as an example of the UE 602, to determine the RV pattern based on information communicated by the base station 604, the processor 804 may receive such information communicated by the base station 604 via the transceiver 810 and process such information to determine the RV pattern. For example, the base station 604 may communicate an RV pattern selection information element (e.g., RV pattern identifier) to the UE 602 to indicate which RV pattern of a plurality of RV patterns (e.g., stored in the memory 805) that the UE 602 should select and apply. In another example, the UE 602 may receive an explicit indication of an RV pattern from the base station 604 that defines the RV pattern for the UE 602 to use for a corresponding transmission. For example, the explicit indication may include each RV of the RV pattern. By determining the RV pattern based on information communicated by the base station 604, the UE 602 and base station 604 can adapt and select RV patterns particular to different scenarios (e.g., different data error rates, different numbers of UEs attempting to schedule via a random access procedure, etc.).

In some examples where the UE 602 determines the RV pattern based on information communicated by the base station 604, the base station 604 may include such information within an RV configuration message in a DCI, as previously described. For example, and with reference to FIG. 6 and its corresponding description above, the base station 604 may transmit the RV configuration message using one or more bits in a DCI having DCI format 0_0 in connection with a MSG3 retransmission request 610 or using one or more bits in a DCI having DCI format 1_0 in connection with a RAR message 606. Accordingly, at least in some examples, previously unused bits in a DCI may be used to provide the RV configuration message without the addition of new messages into the random access procedure.

In some examples, determining the RV pattern includes determining which RV within the RVs making up the RV pattern is the starting RV (i.e., the first RV in the sequence that is to be applied to a message to generate the first repetition). The starting RV may be the first RV in the RV pattern, or may be another RV within the RV pattern. For example, returning to the exemplary RV pattern {0, 2, 3, 1}, the starting RV may be the first RV in the RV pattern (i.e., RV {0}), which may be described as the RV in the RV pattern having an index k=0, which is RV 0 in this example. Alternatively, the starting RV may another RV in the RV pattern having a different index (e.g., index k=1, 2, or 3). In some examples, the starting RV is fixed and determined by the UE 602 by accessing a memory (e.g., the memory 805 may store the starting RV along with the one or more RV patterns 860). Alternatively, in some examples, the starting RV is determined by the UE 602 based on information communicated by the base station 604. For example, the information communicated by the base station 604 may include a value for the index k of the starting RV (e.g., as part of the DCI), which may also be referred to as the RV information element (see, e.g., the RV information element described to with respect to blocks 904, 906, and 910 of FIG. 9). Having a starting RV that is fixed can reduce communications and improve efficiency for the RV pattern determination, while allowing the base station 604 to specify the starting RV allows the UE 602 and base station 604 to adapt the RV pattern to different scenarios (e.g., different data error rates, numbers of UEs attempting to schedule via a random access procedure, etc.). For example, a particular RV within the RV pattern may be more likely to result in a successful MSG3 transmission in a particular scenario. Accordingly, it may be beneficial to start with this particular RV, in some examples.

In some examples, determining the RV pattern includes determining a number of repetitions r to be generated and transmitted by the UE 602. The number of repetitions may be the number of RVs within the RV pattern (e.g., r=4 in the example RV pattern {0, 2, 3, 1}) or may be another number greater than or less than the number of RVs within the RV pattern (e.g., r=1, 2, 3, 5, 6, 7, etc.). In some examples, the number of repetitions r is fixed and determined by the UE 602 by accessing a memory (e.g., the memory 805 may store the number of repetitions r along with the one or more RV patterns 860). Alternatively, in some examples, the number of repetitions r is determined by the UE 602 based on information communicated by the base station 604. For example, the information communicated by the base station 604 may include the number of repetitions r (e.g., as part of the DCI). Having a number of repetitions r that is fixed can reduce communications and improve efficiency for the RV pattern determination, while allowing the base station 604 to specify the number of repetitions r allows the UE 602 and base station 604 to adapt the RV pattern to different scenarios (e.g., different data error rates, numbers of UEs attempting to schedule via a random access procedure, etc.). Additionally, the value of r is not limited by the quantity of RVs in the RV pattern because the UE 602 may cyclically repeat a determined RV pattern until it transmits the given number of repetitions r. For example, when the UE 602 determines an RV pattern {0, 2, 3, 1} that has a starting RV of index k=0 (i.e., RV {0}) and a number of repetitions r=6, the UE 602 applies the following sequence of RVs to generate repetitions: RV 0, RV 2, RV 3, RV 1, RV 0, RV 2. By cyclically repeating an RV pattern, the UE 602 may generate more repetitions than RVs within an RV pattern, potentially increasing the likelihood that a transmission can be decoded by the base station 604.

Furthermore, as noted, in block 1008, each repetition in the UL communication is configured by applying a respective RV of the RV pattern to the UL message. For example, with reference to FIG. 3, the UL message (MSG3) may be the "coded bits 308" and the UE 602 may generate the number of repetitions of the UL message by applying a respective RV of the plurality of RVs (which may be collectively represented by the redundancy version (RV) 310 in FIG. 3), to the UL message based on the plurality of RVs of the RV pattern. For example, returning to the exemplary RV pattern of {0, 2, 3, 1}, and assuming a starting RV at index k=0 and a number of repetitions r=6, the UE 602 may generate and transmit repetitions including: RV 0 of the UL message, RV 2 of the UL message, RV 3 of the UL message, RV 1 of the UL message, RV 0 of the UL message, and RV 2 of the UL message. As discussed with respect to block 912 of FIG. 9, the RV pattern may be applied cyclically such that the index k is incremented (e.g., k=k+1) with each repetition transmission until, if the end of the RV pattern is reached (i.e., when index k=x−1), the next RV is the first RV in the RV pattern (i.e., index k=0). Like the RVs and the coded bits 308 described with respect to FIG. 3, the particular operations on the UL message to generate the repetitions are indicated by the respective RVs and may include, for example, shift operations on the UL message, selection of a particular portion of the UL message, selection of the entire UL message, or other operations.

In some examples, the UE 602 transmits the UL communication on a physical uplink shared channel (PUSCH). For example, the UE 602 may transmit respective repetitions of the UL communication in multiple corresponding slots on the PUSCH. With reference to the scheduled entity 800 of FIG. 8 as an example of the UE 602, to transmit the UL communication to the base station in block 1008 of the process 1000, the processor 804 may transmit the UL communication via transceiver 810.

At block 1010, the UE 602 receives a downlink message from the base station 604 based on the UL message. The downlink message is, for example, MSG4 614 of FIG. 6. The downlink message may include scheduling information for the UE 602 to use in further uplink communications with the base station 604. For example, the downlink message may include a temporary identity of the UE 602 (temporary_C-RNTI) which may have been transmitted to the base station 604 in whole or in part in an earlier communication from the UE 602 (e.g., in the UL message/MSG3). In some examples, the UE 602 is configured to recognize the temporary identity within the downlink message and promote the temporary identity temporary_C-RNTI to an identity (C-RNTI) that is then used by the UE 602 for further uplink communications with the base station 604.

As noted above with respect to block 1008, in some examples of the process 1000, the UL communication of block 1008 is an initial UL communication that includes the UL message (e.g., MSG3 in its entirety) and the plurality of repetitions of the UL message. With reference to FIG. 6, this UL communication may be sent in response to the random access response message (RAR/MSG2). In these examples, the RV pattern applied to generate the repetitions of the UL communication may be referred to as an initial RV pattern. Additionally, in these examples, the UE 602 may further receive a retransmit request from the base station 604 (e.g., MSG3 retransmission request 610 of FIG. 6) to retransmit the UL communication. In response, the UE 602 may further determine a retransmission redundancy version (RV) pattern including a retransmission sequence of RVs. The UE 602 may further transmit, in response to the retransmit request, a UL communication retransmission. The UL communication retransmission may include a plurality of repetitions of a UL message retransmission, each repetition of the plurality of repetitions being configured by applying, to the UL message retransmission, a respective RV of an RV pattern that has a plurality of RVs. The UL message retransmission may be the UL message (e.g., MSG3 in its entirety), a subset of the UL message, a modified or encoded version of the UL message, or a message otherwise linked to the UL message (e.g., linked as being part of the same random access procedure).

In some examples, the UE 602 reuses the RV pattern referred to in block 1008 as the retransmission RV pattern. In other words, the UE 602 determines the retransmission RV pattern to be the initial RV pattern. In other examples, the UE 602 determines the retransmission RV pattern using one of the techniques described above with respect to block 1008. For example, the retransmission RV pattern may be fixed and the UE 602 determines the retransmission RV pattern by accessing the fixed RV pattern from a memory (e.g., from one or more RV patterns 860 in the memory 805). In other examples, the UE 602 determines the retransmission RV pattern based on information communicated by the base station 604 and received by the UE 602. For example, the base station 604 may communicate an RV pattern selection information element (e.g., RV pattern identifier) to the UE 602 to indicate which RV pattern of a plurality of RV patterns (e.g., stored in the memory 805) that the UE 602 should select and apply as retransmission RV pattern. In another example, the UE 602 may receive an explicit indication of an RV pattern from the base station 604 that defines the retransmission RV pattern for the UE 602 to use for a corresponding retransmission. In some examples, like the RV pattern discussed in block 1008, the retransmission RV pattern is associated with a starting RV and/or a number of repetitions r, which function similarly as described above, but for being applicable to the retransmission RV pattern. One or both of the starting RV and/or the number of repetitions r may be fixed values stored in a memory (e.g., the memory 805) and accessed by the UE 602, or may be determined by the UE 602 based on information communicated from the base station 604.

In some examples where the UE 602 determines the retransmission RV pattern, the starting RV for the retransmission RV pattern, and/or the number of repetitions r from information communication by the base station 604, the base station 604 may include such information within an RV configuration message in a DCI, as previously described. For example, and with reference to FIG. 6, as described above, the base station 604 may transmit the RV configuration message using one or more bits in a DCI having DCI format 0_0 in connection with a MSG3 retransmission request 610. In some examples, the starting RV for the retransmission RV pattern may be indicated in one or more bits (e.g., a two-bit RV information element) in a DCI having DCI format 0_0 with a CRC scrambled by TC-RNTI, as described above.

As noted, in some examples, the UE 602 receives an RV configuration message from the base station 604, and the retransmission RV pattern is determined based on the RV configuration message. In some of these examples, the initial RV pattern referred to in block 1008 (i.e., for the initial UL communication) is a fixed RV pattern that is known by both the UE 602 and the base station 604. Accordingly, the initial UL communication (see MSG3 608 of FIG. 6) may be associated with a RV technique that includes sending repetitions according to a fixed RV pattern, while the RV technique for the UL communication retransmission (see MSG3 retransmission 612 of FIG. 6) is adaptable based on the RV configuration message to allow the UE 602 and base station 604 to select and/or adjust the retransmission RV pattern to a particular scenario.

In some examples, the initial RV pattern for the initial UL communication (e.g., MSG3 608 of FIG. 6) may be a fixed RV pattern and the plurality of repetitions of the UL message are configured by applying the plurality of RVs to the UL message in sequence according to the RV pattern, starting with a first RV of the sequence of the plurality of RVs of the RV pattern (i.e., RV with index 0), and continuing in sequence according to the RV pattern cyclically, wrapping from an end of the sequence to a beginning of the sequence, until each repetition of the plurality of repetitions of the UL message is configured. Further, in some examples, an RV configuration message from the base station for the UL communication retransmission is indicated in a redundancy version field, or one or more repurposed bits from a set of reserved bits, in a DCI format 0_0 with a cyclic redundancy check (CRC) scrambled by a temporary cell-radio network temporary identifier (TC-RNTI), the RV configuration message indicating a starting RV of the retransmission RV pattern. For example, a two-bit RV information element indicated in the DCI may provide an index value for the starting RV within the retransmission RV pattern. Then, the plurality of repetitions of the UL message retransmission are configured by applying the retransmission sequence of RVs to the UL message retransmission in sequence according to the retransmission RV pattern, starting with the starting RV of the retransmission RV pattern, and continuing in sequence according to the retransmission RV pattern cyclically, wrapping from an end of the retransmission sequence to a beginning of the retransmission sequence, until each repetition of the plurality of repetitions of the UL message retransmission is configured.

In other examples, the initial RV pattern for the initial UL communication (e.g., MSG3 608 of FIG. 6) is a first fixed RV pattern and the retransmission RV pattern for the UL communication retransmission (e.g., MSG3 retransmission 612 of FIG. 6) is a second fixed RV pattern. Here, the first and second fixed RV patterns may be the same RV patterns applied by starting with the same starting RV, may be the same RV patterns but applied by starting with a different starting RV, or may be different RV patterns.

In some examples of the process 1000, the UE 602 further receives a repetition enabling indication from the base station 604. The repetition enabling indication may be an indication (e.g., a binary indication) of whether the UE 602 is to include repetitions of the UL message in the UL communication. Thus, the base station 604 is configured to disable repetitions by the UE 602, for example, in situations with low network traffic or where communications are sufficiently reliable without repetitions. The repetition enabling indication may be provided by the base station 604, and received by the UE 602, as part of a RV configuration message. As previously noted, and with reference to FIG. 6, the RV configuration message may be part of, for example, an SIB 601, a RAR/MSG2 606, or a MSG3 retransmission request 610.

Figure 11:
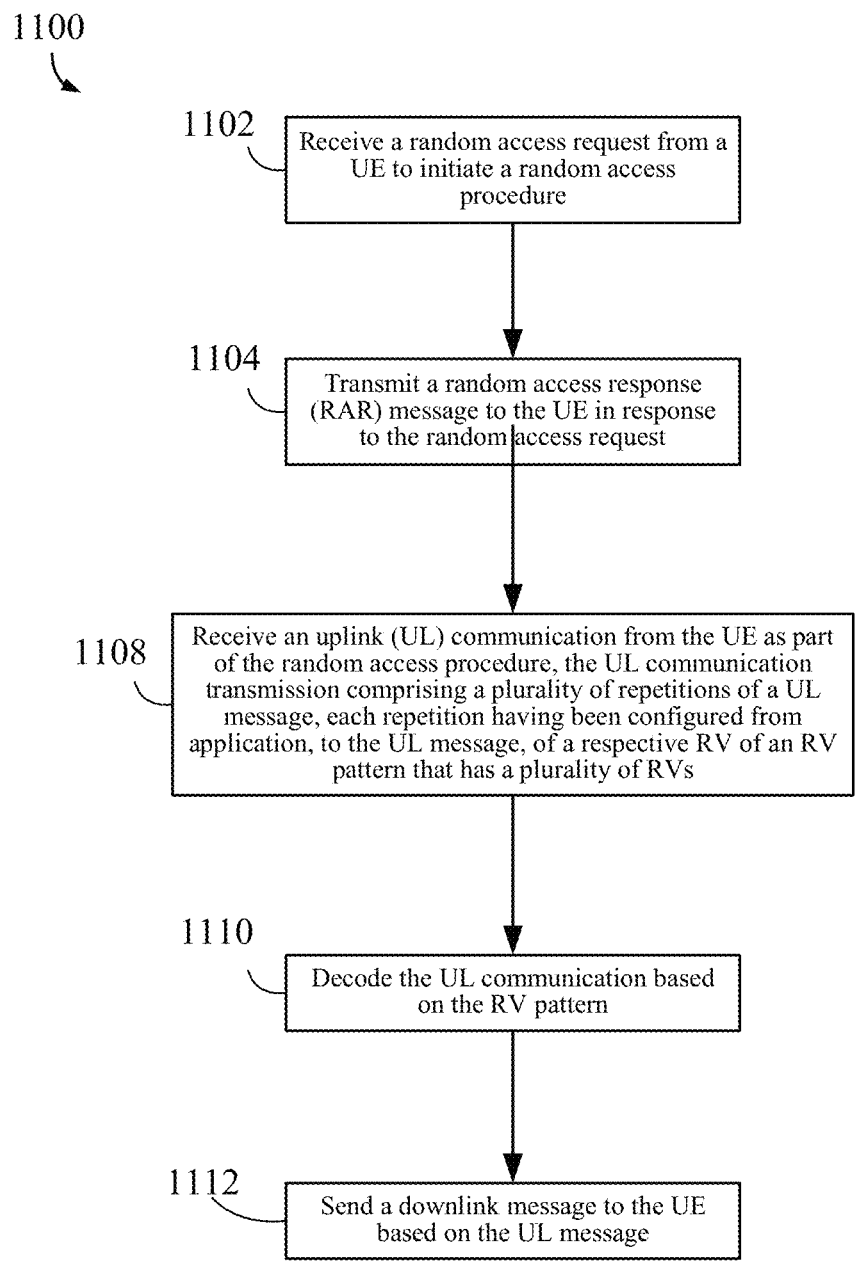
FIG. 11 is a flow chart illustrating another exemplary process for a random access procedure according to some embodiments of the disclosure.

FIG. 11 is a flow chart illustrating an exemplary process 1100 for RV pattern determination and message transmission employing repetition in accordance with some aspects of the present disclosure. As described below, a particular implementation may omit some or all illustrated features, and may not require some illustrated features to implement all embodiments. In some examples, the scheduled entity 700 illustrated in FIG. 7 may be configured to carry out the process 1100. However, the process 1100 may also be implemented by other wireless communication devices. To simplify the discussion, the flow chart of FIG. 11 below is described with respect to the wireless communication devices of FIG. 6, i.e., the UE 602 (which may take the form of the scheduled entity 800 of FIG. 8) and the base station 604 (which may take the form of the scheduling entity 700). In some examples, any suitable apparatus or means for carrying out the functions or algorithm described below may carry out the process 1100.

At block 1102, the base station 604 receives a random access request from the UE 602 to initiate a random access procedure. For example, with reference to FIG. 6, the UE 602 transmits a random access request 603 (also referred to as a RACH preamble or Message 1 (MSG1)), to the base station 604 over a physical random access channel (PRACH). The MSG1 603 indicates a request by the UE 602 to initiate a connection with the base station 604. Accordingly, this transmission of the MSG1 603 initiates the random access procedure with the base station 604. With reference to the scheduling entity 700 of FIG. 7 as an example of the base station 604, the processor 704 may receive the random access request 603 via the transceiver 710.

At block 1104, the base station 604 transmits a random access response (RAR) message from to the UE 602 in response to the random access request. For example, with reference to FIG. 6, the UE 602 receives RAR/MSG2 606 from the base station 604. The base station 604 transmits the RAR/MSG2 606 in response to receipt and decoding of the MSG1 603. As noted with respect to FIG. 6, the RAR/MSG2 606 may include a PDCCH including a DCI with a CRC scrambled by the RA-RNTI; a DCI for scheduling a corresponding PDSCH; and the corresponding PDSCH. With reference to the scheduling entity 700 of FIG. 7 as an example of the base station 604, to transmit the RAR message, the processor 704 may transmit the RAR/MSG2 606 via the transceiver 710.

At block 1108, the base station 604 receives an uplink (UL) communication from the UE as part of the random access procedure. The UL communication includes a plurality of repetitions of a UL message, where each repetition is configured from application, to the UL message, of a respective redundancy version (RV) of an RV pattern that has a plurality of RVs. In some examples, the UL communication corresponds to the initial MSG3 transmission 608 of FIG. 6. For example, the UL communication received by the base station 604 in block 1108 includes the initial MSG3 (e.g., in its entirety) along with repetitions of the MSG3. In further examples, the UL communication corresponds to the MSG3 retransmission 612 of FIG. 6 that is sent in response to receiving a retransmission request from the base station 604 (see MSG3 retransmission request 610). In these examples, the UL communication received by the base station 604 in block 1108 is a UL communication retransmission that may include both the retransmitted MSG3 (e.g., MSG3 in its entirety) along with repetitions of MSG3, or that may include repetitions of MSG3, but without the full MSG3.

As part of block 1108, the base station 604 may determine the RV pattern. In some examples, the RV pattern is a fixed RV pattern (also referred to as a static or predetermined RV pattern), and the base station 604 determines the RV pattern by accessing a memory of the base station 604 that stores the fixed RV pattern. For example, with reference to the scheduling entity 700 of FIG. 7 as an example of the base station 604, to determine the RV pattern, the processor 704 may access a fixed RV pattern that is stored in the memory 705. Use of a fixed RV pattern can reduce communications and improve efficiency for the determination of the RV pattern. In some examples, the base station 604 sends a communication to the UE 602 that indicates the RV pattern (e.g., via the transceiver 710), such as described with respect to block 1008 of FIG. 10.

In some examples, determining the RV pattern includes determining which RV within the RVs making up the RV pattern is the starting RV (i.e., the first RV in the sequence that is to be applied to a message to generate the first repetition). The starting RV may be the first RV in the RV pattern, or may be another RV within the RV pattern. For example, returning to the exemplary RV pattern {0, 2, 3, 1}, the starting RV may be the first RV in the RV pattern (i.e., RV {0}), which may be described as the RV in the RV pattern having an index k=0, which is RV 0 in this example. Alternatively, the starting RV may another RV in the RV pattern having a different index (e.g., index k=1, 2, or 3). In some examples, the starting RV is fixed and determined by the base station 604 by accessing a memory (e.g., the memory 705 may store the starting RV along with the one or more RV patterns). Alternatively, in some examples, the starting RV is determined by the base station 604 based on a detected scenario or condition (e.g., different data error rates, numbers of UEs attempting to schedule via a random access procedure, etc.). For example, a particular RV within the RV pattern may be more likely to result in a successful MSG3 transmission in a particular scenario. Accordingly, it may be beneficial to start with this particular RV, in some examples.

In some examples, determining the RV pattern includes determining a number of repetitions r to be generated and transmitted by the UE 602. The number of repetitions may be the number of RVs within the RV pattern (e.g., r=4 in the example RV pattern {0, 2, 3, 1}) or may be another number greater than or less than the number of RVs within the RV pattern (e.g., r=1, 2, 3, 5, 6, 7, etc.). In some examples, the number of repetitions r is fixed and determined by the base station 604 by accessing a memory (e.g., the memory 705 may store the number of repetitions r along with the one or more RV patterns). Alternatively, in some examples, the number of repetitions r is determined by the base station 604 based on a detected scenario or condition (e.g., different data error rates, numbers of UEs attempting to schedule via a random access procedure, etc.). For example, a particular number of repetitions r may be more likely to result in a successful MSG3 transmission in a particular scenario. Accordingly, it may be beneficial to start with this particular value for r, in some examples.

Furthermore, as noted, in block 1108, each repetition in the UL communication is configured from application of a respective RV of the RV pattern to the UL message. In some examples, the UE may generate the repetitions as described with respect to block 1008 of FIG. 10.

At block 1110, the base station 604 decodes the UL communication based on the RV pattern. For example, based on the determined RV pattern, the base station 604 can parse the UL communication into one or more of the MSG3 and repetitions of the MSG3 (e.g., by knowing from the RV pattern the length and format of each of the one or more repetitions of the MSG3 and/or the MSG3). Further, to decode the individual portions of the UL communication (e.g., the MSG3 and/or repetitions), the base station 604 may perform a reverse of the operation that the UE 602 performed to generate the portions using the RV pattern. Additionally, the base station 604 may combine select portions of the UL communication (e.g., portions of the MSG3 and/or portions of the repetitions) to generate the MSG3 from the portions of the UL communication. The base station 604 may identify and select particular portions to use in the combination based on an assessment by the base station 604 of the portions of the UL communication and the likelihood that the decoded data in each respective portions is valid or accurate. As just one example for illustration purposes, if the UL communication is supposed to include the same byte of data in three different portions (e.g., the original MSG and two different repetitions), and the byte of data is the same in two of the three portions, the base station 604 may determine that the byte of data should be as received in the two (equivalent) portions and ignore the byte of data in the third (different) portion, presuming that byte of data to contain an error.

At block 1112, the base station 604 transmits a downlink message to the UE 602 based on the UL message. For example, the base station 604 may determine to transmit the downlink message after correctly decoding the MSG3 from the UL communication received in block 1108. The downlink message is, for example, MSG4 614 of FIG. 6. The downlink message may include scheduling information for the UE 602 to use in further uplink communications with the base station 604. For example, the downlink message may include a temporary identity of the UE 602 (temporary_C-RNTI) which may have been transmitted to the base station 604 in whole or in part in an earlier communication from the UE 602 (e.g., in the UL message/MSG3). In some examples, the UE 602 is configured to recognize the temporary identity within the downlink message and promote the temporary identity temporary_C-RNTI to an identity (C-RNTI) that is then used by the UE 602 for further uplink communications with the base station 604.

As noted above with respect to block 1108, in some examples of the process 1100, the UL communication of block 1108 is an initial UL communication that includes the UL message (e.g., MSG3 in its entirety) and the plurality of repetitions of the UL message. With reference to FIG. 6, this UL communication may be sent in response to the random access response message (RAR/MSG2). In these examples, the RV pattern referenced in block 1108 may be referred to as an initial RV pattern. Additionally, in these examples, the base station 604 may further send a retransmit request to the UE 602 (e.g., MSG3 retransmission request 610 of FIG. 6) to retransmit the UL communication. In response, the base station 604 may further determine a retransmission redundancy version (RV) pattern including a retransmission sequence of RVs. The base station 604 may further receive a UL communication retransmission from the UE 602 in response to the retransmit request. The UL communication retransmission may include a plurality of repetitions of a UL message retransmission, each repetition of the plurality of repetitions being an iteration of the UL message retransmission that is configured by applying a respective RV of the retransmission sequence of RVs to the UL message retransmission based on a sequence of the retransmission sequence of RVs. The UL message retransmission may be the UL message (e.g., MSG3 in its entirety), a subset of the UL message, a modified or encoded version of the UL message, or a message otherwise linked to the UL message (e.g., linked as being part of the same random access procedure).

In some examples, the base station 604 reuses the RV pattern referenced in block 1108 as the retransmission RV pattern. In other examples, the base station 604 determines the retransmission RV pattern using one of the techniques described above with respect to block 1108.

As described herein, a UE (e.g., the UE 602) or a base station (e.g., the base station 604) may use an RV pattern to generate or decode a UL communication, such as described with respect to block 1008 of FIG. 10 and blocks 1108-1110 of FIG. 11. In some of these examples, the RV pattern may be defined in accordance with the below Table 6.1.2.1-2 Redundancy version for PUSHC transmission, from 3GPP technical specification (TS) 38.214 (V16.6.0). For example, in some examples, the RV pattern applied for repetitions of an initial MSG3 transmission is a fixed pattern that follows the first row of the below table (e.g., starting with RV [0]), or is a pattern that follows one of the four rows of the below table, the particular row and/or starting RV being indicated by the base station to the UE. Further, in some examples, the RV pattern applied for repetitions of a MSG3 retransmission is a fixed pattern that follows the first row of the below table (e.g., starting with RV[0]), or is a pattern that follows one of the four rows of the below table, the particular row being indicated by the base station to the UE. In each case, the RV pattern may be applied cyclically, as described above and as indicated by the modulo operator in the table.

TABLE 6.1.2.1-2

Redundancy version for PUSCH transmission

| $rv_{id}$ indicated by the DCI | $rv_{id}$ to be applied to $n^{th}$ transmission occasion (repetition Type A) or $n^{th}$ actual repetition (repetition Type B) | | | |
|---|---|---|---|---|
| scheduling the PUSCH | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Further Examples Having a Variety of Features

Example 1: A method, apparatus, and non-transitory computer-readable medium for wireless communication operable at a user equipment (UE). The UE receives a random access response (RAR) message from a base station as part of the random access procedure. The UE also transmits an uplink (UL) communication to the base station as part of the random access procedure. The UL communication comprises a plurality of repetitions of a UL message, each repetition being configured by applying, to the UL message, a respective RV of an RV pattern having a plurality of RVs. The UE further receives a downlink message from the base station based on the UL message.

Example 2: A method, apparatus, and non-transitory computer-readable medium of Example 1, wherein the UL communication includes the UL message and the plurality of repetitions of the UL message, and wherein the transmitting of the UL communication is in response to the random access response (RAR) message.

Example 3: A method, apparatus, and non-transitory computer-readable medium of any of Examples 1 to 2, further including the UE receiving a retransmit request from the base station to retransmit the UL communication; and transmitting, in response to the retransmit request, a UL communication retransmission, the UL communication retransmission comprising a plurality of repetitions of a UL message retransmission, each repetition of the plurality of repetitions being configured by applying, to the UL message retransmission, a respective RV of a retransmission RV pattern having a plurality of RVs.

Example 4: A method, apparatus, and non-transitory computer-readable medium of Example 3, further including: the UE receiving an RV configuration message from the base station, wherein the retransmission RV pattern is determined based on the RV configuration message, and wherein the RV pattern is a fixed RV pattern.

Example 5: A method, apparatus, and non-transitory computer-readable medium of Example 4, wherein the RV configuration message from the base station is indicated in a redundancy version field in a DCI format 0_0 with a cyclic redundancy check (CRC) scrambled by a temporary cell-radio network temporary identifier (TC-RNTI), the RV configuration message indicating a starting RV of the retransmission RV pattern; wherein the plurality of repetitions of the UL message retransmission are configured by applying RVs of the retransmission RV pattern to the UL message retransmission, starting with the starting RV of the retransmission RV pattern, and continuing in sequence according to the retransmission RV pattern cyclically, wrapping from an end of the retransmission RV pattern to a beginning of the retransmission RV pattern, until each repetition of the plurality of repetitions of the UL message retransmission is configured; and wherein the plurality of repetitions of the UL message are configured by applying the plurality of RVs to the UL message in sequence according to the RV pattern, starting with a first RV of the RV pattern, and continuing in sequence according to the RV pattern cyclically, wrapping from an end of the RV pattern to a beginning of the RV pattern, until each repetition of the plurality of repetitions of the UL message is configured.

Example 6: A method, apparatus, and non-transitory computer-readable medium of any of Examples 3 to 5, wherein the RV pattern is a first fixed RV pattern, wherein the retransmission RV pattern is a second fixed RV pattern.

Example 7: A method, apparatus, and non-transitory computer-readable medium of any of Examples 2 to 3, wherein the RV pattern is a first fixed RV pattern, and wherein the plurality of repetitions are configured by applying the plurality of RVs to the UL message in sequence according to the RV pattern, starting with a first RV of the RV pattern, and continuing in sequence according to the RV pattern cyclically, wrapping from an end of the RV pattern to a beginning of the RV pattern, until each repetition of the plurality of repetitions is configured.

Example 8: A method, apparatus, and non-transitory computer-readable medium of Example 1, wherein the UL communication is a UL communication retransmission sent in response to receiving a request from the base station to retransmit the UL message.

Example 9: A method, apparatus, and non-transitory computer-readable medium of any of Examples 1 to 3 and 8, wherein the RV pattern is a fixed RV pattern.

Example 10: A method, apparatus, and non-transitory computer-readable medium of any of Examples 1 to 3 and 8, further including the UE receiving an RV information element from the base station indicating a starting RV of the RV pattern, and applying the plurality of RVs to the UL message to generate the repetitions without regard for the received RV information element Example 11: A method, apparatus, and non-transitory computer-readable medium of any of Examples 1 to 3 and 8, further including the UE receiving an RV information element from the base station indicating a starting RV of the RV pattern; and the UE applying the starting RV to the UL message to generate a first repetition of the plurality of repetitions.

Example 12: A method, apparatus, and non-transitory computer-readable medium of Example 11, further including the UE applying the plurality of RVs to the UL message in sequence according to the RV pattern, starting with a next RV after the starting RV within the RV pattern, to generate subsequent repetitions of the plurality of repetitions.

Example 13: A method, apparatus, and non-transitory computer-readable medium of Example 12, further including the UE continuing to apply the plurality of RVs to the UL message in sequence according to the RV pattern cyclically, wrapping from an end of the RV pattern to a beginning of the RV pattern, to generate further subsequent repetitions of the plurality of repetitions.

Example 14: A method, apparatus, and non-transitory computer-readable medium of Examples 11, wherein the UL communication is a UL communication retransmission sent in response to receiving a request from the base station to retransmit the UL message, and wherein the RV information element received from the base station is indicated in a redundancy version field in a DCI format 0_0 with a cyclic redundancy check (CRC) scrambled by a temporary cell-radio network temporary identifier (TC-RNTI).

Example 15: A method, apparatus, and non-transitory computer-readable medium of any of Examples 1 to 3 and 8, further including the UE receiving an RV configuration message from the base station; and the UE determining the RV pattern based on the RV configuration message Example 16: A method, apparatus, and non-transitory computer-readable medium of Examples 15, wherein the RV configuration message comprises one or more of: an explicit indication of an RV pattern; an RV pattern selection information element, for selecting the RV pattern from among a plurality of available RV patterns; a repetition enabling indication, for enabling the repetitions of the UL message in the UL communication; or a number-of-repetitions information element indicating a number of the plurality of repetitions.

Example 17: A method, apparatus, and non-transitory computer-readable medium of Example 15, wherein the RV configuration message is an initial RV configuration message, and wherein receiving the initial RV configuration message comprises receiving a first downlink control information (DCI) in association with the random access response (RAR) message from the base station, the first DCI comprising one or more bits configured to indicate the initial RV configuration message Example 18: A method, apparatus, and non-transitory computer-readable medium of Example 17, wherein the one or more bits configured to indicate the initial RV configuration message comprise one or more repurposed bits from a set of reserved bits in a DCI format 1_0 with a cyclic redundancy check (CRC) scrambled by a random access-radio network temporary identifier (RA-RNTI).

Example 19: A method, apparatus, and non-transitory computer-readable medium of Example 15, wherein the RV configuration message is a retransmission RV configuration message, and wherein receiving the retransmission RV configuration message comprises: receiving a downlink control information (DCI) in association with a request to retransmit the UL message, the DCI comprising one or more bits configured to indicate the retransmission RV configuration message.

Example 20: A method, apparatus, and non-transitory computer-readable medium of Example 15, wherein the one or more bits configured to indicate the retransmission RV configuration message comprise one or more bits in a DCI format 0_0 with a cyclic redundancy check (CRC) scrambled by a temporary cell-radio network temporary identifier (TC-RNTI).

Example 21: A method, apparatus, and non-transitory computer-readable medium of Example 20, wherein the one or more bits in the DCI format 0_0 correspond to one or both of a New Data Indicator field, or a HARQ process number field.

Example 22: A method, apparatus, and non-transitory computer-readable medium of Example 15, further including: the UE receiving a system information block (SIB) from the base station, wherein the RV configuration message is received in at least one of: the SIB; the RAR message; or a request from the base station to retransmit the UL message Example 23: A method, apparatus, and non-transitory computer-readable medium of ay of Examples 1 to 22, wherein transmitting the UL communication to the base station as part of the random access procedure includes transmitting the UL communication via a physical uplink shared channel (PUSCH).

Example 24: A method, apparatus, and non-transitory computer-readable medium for wireless communication operable at a base station. The base station receives a random access request from a UE to initiate a random access procedure and transmits a random access response (RAR) message to the UE in response to the random access request. The base station also receives an uplink (UL) communication from the UE as part of the random access procedure. The UL communication comprises a plurality of repetitions of a UL message, each repetition having been configured from application, to the UL message, of a respective RV of an RV pattern having a plurality of RVs. The base station further decodes the UL communication based on the RV pattern, and sends a downlink message to the UE based on the UL message.

Example 25: A method, apparatus, and non-transitory computer-readable medium of Example 24, wherein the UL communication includes the UL message and the plurality of repetitions of the UL message, and wherein the reception of the UL communication is based on the random access response (RAR) message.

Example 26: A method, apparatus, and non-transitory computer-readable medium of any of Examples 24 to 25, further including the base station sending a retransmit request from the base station to retransmit the UL communication; and receiving, in response to the retransmit request, a UL communication retransmission. Here, the UL communication retransmission comprises a plurality of repetitions of a UL message retransmission, each repetition of the plurality of repetitions having been configured from application, to the UL message retransmission, of a respective RV of a retransmission RV pattern having a plurality of RVs.

Example 27: A method, apparatus, and non-transitory computer-readable medium of an Example 26, further including sending an RV configuration message to the UE, wherein the retransmission RV pattern is indicated by the RV configuration message, and wherein the RV pattern is a fixed RV pattern.

Example 28: A method, apparatus, and non-transitory computer-readable medium of Example 24, further including transmitting a request to the UE to retransmit the UL message, wherein the UL communication is a UL communication retransmission sent in response to the request to retransmit the UL message.

This disclosure presents several aspects of a wireless communication network with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The present disclosure uses the word "exemplary" to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The present disclosure uses the term "coupled" to refer to a direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The present disclosure uses the terms "circuit" and "circuitry" broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Applicant provides this description to enable any person skilled in the art to practice the various aspects described herein. Those skilled in the art will readily recognize various modifications to these aspects, and may apply the generic principles defined herein to other aspects. Applicant does not intend the claims to be limited to the aspects shown herein, but to be accorded the full scope consistent with the language of the claims, wherein reference to an element in the singular is not intended to mean "one and only one" unless specifically so stated, but rather "one or more." Unless specifically stated otherwise, the present disclosure uses the term "some" to refer to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a user equipment (UE), comprising:
    receiving a random access response (RAR) message from a base station as part of a random access procedure;
    transmitting an uplink (UL) communication to the base station as part of the random access procedure, the UL communication comprising a plurality of repetitions of a UL message, each repetition of the plurality of repetitions being configured by applying, to the UL message, a respective redundancy version (RV) of an RV pattern having a plurality of RVs, wherein an initial repetition of the plurality of repetitions is configured by applying a default RV index as a starting RV index; and
    receiving a downlink message from the base station based on the UL message.

2. The method of claim 1, wherein the UL communication includes the UL message and the plurality of repetitions of the UL message, and wherein the transmitting of the UL communication is in response to the random access response (RAR) message.

3. The method of claim 1, further comprising:
    receiving a retransmit request from the base station to retransmit the UL communication; and
    transmitting, in response to the retransmit request, a UL communication retransmission, the UL communication retransmission comprising a plurality of repetitions of a UL message retransmission, each repetition of the plurality of repetitions being configured by applying, to the UL message retransmission, a respective RV of a retransmission RV pattern having a plurality of RVs.

4. The method of claim 3, further comprising:
    receiving an RV configuration message from the base station,
    wherein the retransmission RV pattern is determined based on the RV configuration message, and
    wherein the RV pattern is a fixed RV pattern.

5. The method of claim 4,
    wherein the RV configuration message from the base station is indicated in a redundancy version field in a DCI format 0_0 with a cyclic redundancy check (CRC) scrambled by a temporary cell-radio network temporary identifier (TC-RNTI), the RV configuration message indicating a starting RV of the retransmission RV pattern, wherein the plurality of repetitions of the UL message retransmission are configured by applying RVs of the retransmission RV pattern to the UL message retransmission, starting with the starting RV of the retransmission RV pattern, and continuing in sequence according to the retransmission RV pattern cyclically, wrapping from an end of the retransmission RV pattern to a beginning of the retransmission RV pattern, until each repetition of the plurality of repetitions of the UL message retransmission is configured, and wherein the plurality of repetitions of the UL message are configured by applying the plurality of RVs to the UL message in sequence according to the RV pattern, starting with a first RV of the RV pattern, and continuing in sequence according to the RV pattern cyclically, wrapping from an end of the RV pattern to a beginning of the RV pattern, until each repetition of the plurality of repetitions of the UL message is configured.

6. The method of claim 3,
wherein the RV pattern is a first fixed RV pattern, and
wherein the retransmission RV pattern is a second fixed RV pattern.

7. The method of claim 3, further comprising:
receiving an RV information element from the base station indicating a starting RV of the retransmission RV pattern; and
applying the starting RV to the UL message retransmission for the UL communication retransmission to generate a first repetition of the plurality of repetitions of the retransmission RV pattern.

8. The method of claim 7, further comprising:
applying the plurality of RVs to the retransmission UL message in sequence according to the retransmission RV pattern, starting with a next RV after the starting RV within the retransmission RV pattern, to generate subsequent repetitions of the plurality of repetitions of the retransmission RV pattern.

9. The method of claim 8, further comprising:
continuing to apply the plurality of RVs to the retransmission UL message in sequence according to the retransmission RV pattern cyclically, wrapping from an end of the retransmission RV pattern to a beginning of the retransmission RV pattern, to generate further subsequent repetitions of the plurality of repetitions of the retransmission RV pattern.

10. The method of claim 7,
wherein the RV information element received from the base station is indicated in a redundancy version field in a DCI format 0_0 with a cyclic redundancy check (CRC) scrambled by a temporary cell-radio network temporary identifier (TC-RNTI).

11. The method of claim 1,
wherein the RV pattern is a first fixed RV pattern, and
wherein the plurality of repetitions are configured by applying the plurality of RVs to the UL message in sequence according to the RV pattern, starting with a first RV of the RV pattern, and continuing in sequence according to the RV pattern cyclically, wrapping from an end of the RV pattern to a beginning of the RV pattern, until each repetition of the plurality of repetitions is configured.

12. The method of claim 1, further comprising:
receiving an RV information element from the base station indicating a starting RV of the RV pattern; and
applying the plurality of RVs to the UL message to generate the repetitions without regard for the received RV information element.

13. The method of claim 1, further comprising:
receiving an RV configuration message from the base station; and
determining the RV pattern based on the RV configuration message.

14. The method of claim 13, wherein the RV configuration message comprises one or more of:
an explicit indication of an RV pattern;
an RV pattern selection information element, for selecting the RV pattern from among a plurality of available RV patterns;
a repetition enabling indication, for enabling the repetitions of the UL message in the UL communication; or
a number-of-repetitions information element indicating a number of the plurality of repetitions.

15. The method of claim 14, wherein the RV configuration message is an initial RV configuration message, and wherein receiving the initial RV configuration message comprises:
receiving a first downlink control information (DCI) in association with the random access response (RAR) message from the base station, the first DCI comprising one or more bits configured to indicate the initial RV configuration message.

16. The method of claim 15, wherein the one or more bits configured to indicate the initial RV configuration message comprise one or more repurposed bits from a set of reserved bits in a DCI format 1_0 with a cyclic redundancy check (CRC) scrambled by a random access-radio network temporary identifier (RA-RNTI).

17. The method of claim 16, wherein the RV configuration message is a retransmission RV configuration message, and wherein receiving the retransmission RV configuration message comprises:
receiving a downlink control information (DCI) in association with a request to retransmit the UL message, the DCI comprising one or more bits configured to indicate the retransmission RV configuration message.

18. The method of claim 17, wherein the one or more bits configured to indicate the retransmission RV configuration message comprise one or more bits in a DCI format 0_0 with a cyclic redundancy check (CRC) scrambled by a temporary cell-radio network temporary identifier (TC-RNTI).

19. The method of claim 18, wherein the one or more bits in the DCI format 0_0 correspond to one or both of a New Data Indicator field, or a HARQ process number field.

20. The method of claim 1, wherein transmitting the UL communication to the base station as part of the random access procedure includes transmitting the UL communication via a physical uplink shared channel (PUSCH).

21. The method of claim 1, wherein the initial repetition is configured by applying an RV index of 0 as the default RV index.

22. An apparatus for wireless communication, comprising:
at least one processor;
a transceiver communicatively coupled to the at least one processor; and
a memory communicatively coupled to the at least one processor,
wherein the at least one processor and memory are configured to:
receive, via the transceiver, a random access response (RAR) message from a base station as part of a random access procedure;
transmit, via the transceiver, an uplink (UL) communication to the base station as part of the random access procedure, the UL communication comprising a plurality of repetitions of a UL message, each repetition of the plurality of repetitions being configured by applying, to the UL message, a respective redundancy version (RV) of an RV pattern having a plurality of RVs, wherein an initial repetition of the plurality of repetitions is configured by applying a default RV index as a starting RV index; and receive, via the transceiver, a downlink message from the base station based on the UL message.

23. The apparatus of claim 22, wherein the UL communication includes the UL message and the plurality of repetitions of the UL message, and wherein the at least one processor and memory are configured to transmit the UL communication in response to the random access response (RAR) message.

24. The apparatus of claim 22, wherein the at least one processor and memory are further configured to:
receive a retransmit request from the base station to retransmit the UL communication; and
transmit, in response to the retransmit request, a UL communication retransmission, the UL communication retransmission comprising a plurality of repetitions of a UL message retransmission, each repetition of the plurality of repetitions being configured by applying, to the UL message retransmission, a respective RV of a retransmission RV pattern having a plurality of RVs.

25. The apparatus of claim 24, wherein the at least one processor and memory are further configured to:
receive an RV configuration message from the base station,
wherein the retransmission RV pattern is determined based on the RV configuration message, and
wherein the RV pattern is a fixed RV pattern.

26. The apparatus of claim 24,
wherein the RV pattern is a first fixed RV pattern, and
wherein the retransmission RV pattern is a second fixed RV pattern.

27. The apparatus of claim 24, wherein the at least one processor and memory are further configured to:
receive an RV information element from the base station indicating a starting RV of the retransmission RV pattern; and
apply the starting RV to the UL message retransmission for the UL communication retransmission to generate a first repetition of the plurality of repetitions of the retransmission RV pattern.

28. The apparatus of claim 27, wherein the at least one processor and memory are further configured to:
apply the plurality of RVs to the UL message retransmission in sequence according to the retransmission RV pattern, starting with a next RV after the starting RV within the retransmission RV pattern, to generate subsequent repetitions of the plurality of repetitions of the retransmission RV pattern.

29. The apparatus of claim 28, wherein the at least one processor and memory are further configured to:
continue to apply the plurality of RVs to the UL message retransmission in sequence according to the retransmission RV pattern cyclically, wrapping from an end of the retransmission RV pattern to a beginning of the retransmission RV pattern, to generate further subsequent repetitions of the plurality of repetitions of the retransmission RV pattern.

30. The apparatus of claim 27,
wherein the RV information element received from the base station is indicated in a redundancy version field in a DCI format 0_0 with a cyclic redundancy check (CRC) scrambled by a temporary cell-radio network temporary identifier (TC-RNTI).

31. The apparatus of claim 25,
wherein the RV configuration message from the base station is indicated in a redundancy version field in a DCI format 0_0 with a cyclic redundancy check (CRC) scrambled by a temporary cell-radio network temporary identifier (TC-RNTI), the RV configuration message indicating a starting RV of the retransmission RV pattern,
wherein the plurality of repetitions of the UL message retransmission are configured by applying RVs of the retransmission RV pattern to the UL message retransmission, starting with the starting RV of the retransmission RV pattern, and continuing in sequence according to the retransmission RV pattern cyclically, wrapping from an end of the retransmission RV pattern to a beginning of the retransmission RV pattern, until each repetition of the plurality of repetitions of the UL message retransmission is configured, and
wherein the plurality of repetitions of the UL message are configured by applying the plurality of RVs to the UL message in sequence according to the RV pattern, starting with a first RV of the RV pattern, and continuing in sequence according to the RV pattern cyclically, wrapping from an end of the RV pattern to a beginning of the RV pattern, until each repetition of the plurality of repetitions of the UL message is configured.

32. The apparatus of claim 22,
wherein the RV pattern is a first fixed RV pattern, and
wherein the plurality of repetitions are configured by applying the plurality of RVs to the UL message in sequence according to the RV pattern, starting with a first RV of the RV pattern, and continuing in sequence according to the RV pattern cyclically, wrapping from an end of the RV pattern to a beginning of the RV pattern, until each repetition of the plurality of repetitions is configured.

33. The apparatus of claim 22, wherein the at least one processor and memory are further configured to:
receive an RV information element from the base station indicating a starting RV of the RV pattern, and
apply the plurality of RVs to the UL message to generate the repetitions without regard for the received RV information element.

34. The apparatus of claim 22, wherein the at least one processor and memory are further configured to:
receive an RV configuration message from the base station; and
determine the RV pattern based on the RV configuration message.

35. The apparatus of claim 34, wherein the RV configuration message comprises one or more of:
an explicit indication of an RV pattern;
an RV pattern selection information element, for selecting the RV pattern from among a plurality of available RV patterns;
a repetition enabling indication, for enabling the repetitions of the UL message in the UL communication; or
a number-of-repetitions information element indicating a number of the plurality of repetitions.

36. The apparatus of claim 35, wherein the RV configuration message is an initial RV configuration message and, to receive the initial RV configuration message, and wherein the at least one processor and memory are further configured to:

receive a first downlink control information (DCI) in association with the random access response (RAR) message from the base station, the first DCI comprising one or more bits configured to indicate the initial RV configuration message.

37. The apparatus of claim 36, wherein the one or more bits configured to indicate the initial RV configuration message comprise one or more repurposed bits from a set of reserved bits in a DCI format 1_0 with a cyclic redundancy check (CRC) scrambled by a random access-radio network temporary identifier (RA-RNTI).

38. The apparatus of claim 37, wherein the RV configuration message is a retransmission RV configuration message, and wherein, to receive the retransmission RV configuration message, the at least one processor and memory are further configured to:
receive a downlink control information (DCI) in association with a request to retransmit the UL message, the DCI comprising one or more bits configured to indicate the retransmission RV configuration message.

39. The apparatus of claim 38, wherein the one or more bits configured to indicate the retransmission RV configuration message comprise one or more bits in a DCI format 0_0 with a cyclic redundancy check (CRC) scrambled by a temporary cell-radio network temporary identifier (TC-RNTI).

40. The apparatus of claim 39, wherein the one or more bits in the DCI format 0_0 correspond to one or both of a New Data Indicator field, or a HARQ process number field.

41. The apparatus of claim 22, wherein, to transmit the UL communication to the base station as part of the random access procedure, the at least one processor and memory are further configured to transmit the UL communication via a physical uplink shared channel (PUSCH).

42. The apparatus of claim 22, wherein the initial repetition is configured by applying an RV index of 0 as the default RV index.

43. A method of wireless communication operable at a base station, the method comprising:
receiving a random access request from a UE to initiate a random access procedure;
transmitting a random access response (RAR) message to the UE in response to the random access request;
receiving an uplink (UL) communication from the UE as part of the random access procedure, the UL communication comprising a plurality of repetitions of a UL message, each repetition of the plurality of repetitions having been configured from application, to the UL message, of a respective redundancy version (RV) of an RV pattern having a plurality of RVs, wherein an initial repetition of the plurality of repetitions is configured by applying a default RV index as a starting RV index;
decoding the UL communication based on the RV pattern; and
sending a downlink message to the UE based on the UL message.

44. The method of claim 43, wherein the UL communication includes the UL message and the plurality of repetitions of the UL message, and wherein the reception of the UL communication is based on the random access response (RAR) message.

45. The method of claim 44, further comprising:
sending a retransmit request from the base station to retransmit the UL communication; and
receiving, in response to the retransmit request, a UL communication retransmission, the UL communication retransmission comprising a plurality of repetitions of a UL message retransmission, each repetition of the plurality of repetitions having been configured from application, to the UL message retransmission, of a respective RV of a retransmission RV pattern having a plurality of RVs.

46. The method of claim 45, further comprising:
sending an RV configuration message to the UE,
wherein the retransmission RV pattern is indicated by the RV configuration message, and
wherein the RV pattern is a fixed RV pattern.

47. The method of claim 43, further comprising:
transmitting a request to the UE to retransmit the UL message, wherein the UL communication is a UL communication retransmission sent in response to the request to retransmit the UL message.

48. An apparatus for wireless communication, comprising:
at least one processor;
a transceiver communicatively coupled to the at least one processor; and
a memory communicatively coupled to the at least one processor,
wherein the at least one processor and memory are configured to:
receive, via the transceiver, a random access request from a UE to initiate a random access procedure;
transmit, via the transceiver, a random access response (RAR) message to the UE in response to the random access request;
receive, via the transceiver, an uplink (UL) communication from the UE as part of the random access procedure, the UL communication comprising a plurality of repetitions of a UL message, each repetition of the plurality of repetitions having been configured from application, to the UL message, of a respective redundancy version (RV) of an RV pattern having a plurality of RVs, wherein an initial repetition of the plurality of repetitions is configured by applying a default RV index as a starting RV index;
decode the UL communication based on the RV pattern; and
send, via the transceiver, a downlink message to the UE based on the UL message.

49. The apparatus of claim 48, wherein the UL communication includes the UL message and the plurality of repetitions of the UL message, and wherein the reception of the UL communication is based on the random access response (RAR) message.

50. The apparatus of claim 49, wherein the at least one processor and memory are further configured to:
send a retransmit request to the UE to retransmit the UL communication; and
receive, in response to the retransmit request, a UL communication retransmission, the UL communication retransmission comprising a plurality of repetitions of a UL message retransmission, each repetition of the plurality of repetitions having been configured from application, to the UL message retransmission, of a respective RV of a retransmission RV pattern having a plurality of RVs.

51. The apparatus of claim 50, wherein the at least one processor and memory are further configured to:
send, via the transceiver, an RV configuration message to the UE,
wherein the retransmission RV pattern is indicated by the RV configuration message, and
wherein the RV pattern is a fixed RV pattern.

52. The apparatus of claim 48, wherein the at least one processor and memory are further configured to:
    transmit, via the transceiver, a request to the UE to retransmit the UL message, wherein the UL communication is a UL communication retransmission sent in response to the request to retransmit the UL message.

\* \* \* \* \*